US012648638B2

(12) United States Patent
Yang et al.

(10) Patent No.: US 12,648,638 B2
(45) Date of Patent: Jun. 9, 2026

(54) BUILT-IN ELECTRONICALLY MOVABLE WASTE RECEPTACLES

(71) Applicant: simplehuman, LLC, Torrance, CA (US)

(72) Inventors: Frank Yang, Rancho Palos Verdes, CA (US); Ryan Wong, Long Beach, CA (US); Cory Bowman, Mission Viejo, CA (US); William Patrick Conley, Long Beach, CA (US)

(73) Assignee: simplehuman, LLC, Torrance, CA (US)

( * ) Notice: Subject to any disclaimer, the term of this patent is extended or adjusted under 35 U.S.C. 154(b) by 0 days.

(21) Appl. No.: 17/456,460

(22) Filed: Nov. 24, 2021

(65) Prior Publication Data

US 2022/0160126 A1 May 26, 2022

Related U.S. Application Data

(60) Provisional application No. 63/119,469, filed on Nov. 30, 2020, provisional application No. 63/118,616, filed on Nov. 25, 2020.

(51) Int. Cl.
*A47B 77/18* (2006.01)
*A47B 77/08* (2006.01)
(Continued)

(52) U.S. Cl.
CPC .............. *A47B 77/18* (2013.01); *A47B 77/08* (2013.01); *A47B 77/10* (2013.01); *A47B 88/457* (2017.01);
(Continued)

(58) Field of Classification Search
CPC ......... A47B 77/08; A47B 77/10; A47B 77/18; A47B 88/457; A47B 88/0414;
(Continued)

(56) References Cited

U.S. PATENT DOCUMENTS 2,699,368 A * 1/1955 Selmer .................. B65F 1/1436 312/319.9
3,886,425 A 5/1975 Weiss
(Continued)

FOREIGN PATENT DOCUMENTS

CA 2519295 3/2007
CN 103207416 7/2013
(Continued)

OTHER PUBLICATIONS

YouTube.com, "Automatic trash can pull out cabinet with Arduino (DIY)", dated Oct. 9, 2019, https://www.youtube.com/watch?v=mmcgTaE45_Y, entire video, including screenshot in 1 page.
(Continued)

*Primary Examiner* — Andrew Roersma
(74) *Attorney, Agent, or Firm* — Knobbe, Martens, Olson & Bear, LLP

(57) ABSTRACT

This disclosure includes a description of various embodiments of waste-receiving systems. In some embodiments, a waste-receiving system comprises at least one waste receptacle configured to be positioned inside of a cabinet, an electric drive system configured to transition the waste-receiving system from a retracted or closed position within a closed cabinet to an extended or open position that provides access to the waste receptacle inside of the waste-receiving system, such as by moving the waste receptacle at least partially outside of the cabinet or opening a cabinet door or access region. The system can include a sensor system configured to generate one or more electronic signals from an environment, such as from a user, and a processor in electronic communication with the sensor system and a motor, the processor configured to actuate the motor based at least in part on the one or more electronic signals received from the sensor system. In some embodiments, the waste-receiving system may further comprise a cabinet. In some
(Continued)

embodiments, the waste-receiving system may have at least one waste receptacle that is supported by a holder. In some embodiments, the waste-receiving system can have a drive system that is configured to move the at least one receptacle by moving the holder.

24 Claims, 19 Drawing Sheets

(51) Int. Cl.
*A47B 77/10* (2006.01)
*A47B 88/457* (2017.01)
*B65F 1/14* (2006.01)
*B65F 1/16* (2006.01)

(52) U.S. Cl.
CPC .............. *B65F 1/1436* (2013.01); *B65F 1/16* (2013.01); *B65F 2210/168* (2013.01)

(58) Field of Classification Search
CPC ............. A47B 88/53; A47B 2210/0089; B65F 1/1436; B65F 1/16; B65F 2210/168
See application file for complete search history.

(56) References Cited

U.S. PATENT DOCUMENTS 4,217,616 A 8/1980 Jessup
4,729,490 A 3/1988 Ziegenbein
4,794,973 A 1/1989 Perisic
4,888,532 A * 12/1989 Josson .................... G01S 17/87 250/221
4,996,467 A 2/1991 Day
5,048,903 A 9/1991 Loblein
5,329,212 A 7/1994 Feigleson
5,535,913 A 7/1996 Asbach et al.
5,644,111 A 7/1997 Cerny et al.
5,650,680 A 7/1997 Chula
5,724,837 A 3/1998 Shin
5,770,935 A 6/1998 Smith et al.
6,091,064 A * 7/2000 Eaton ....................... G01V 8/12 250/221
6,211,637 B1 4/2001 Studer
6,401,958 B1 6/2002 Foss et al.
6,519,130 B1 2/2003 Breslow
6,596,983 B2 7/2003 Brent
6,739,474 B1 5/2004 Wang
6,812,655 B1 11/2004 Wang et al.
6,859,005 B2 2/2005 Boliver
6,974,948 B1 12/2005 Brent
7,370,919 B2 * 5/2008 Rapier, III ........... A47B 88/427 312/308
7,416,093 B2 8/2008 Lin et al.
7,494,021 B2 2/2009 Yang et al.
7,602,135 B2 * 10/2009 Huber .................. A47B 88/457 318/560
7,633,258 B2 * 12/2009 Huber .................. A47B 88/463 318/646
7,656,109 B2 2/2010 Yang et al.
7,694,838 B2 4/2010 Yang et al.
7,712,285 B2 5/2010 Stravitz et al.
7,741,801 B2 6/2010 Fukuizumi
7,748,556 B2 7/2010 Yang et al.
7,774,202 B2 8/2010 Spengler et al.
7,781,995 B2 8/2010 Yang et al.
7,888,898 B2 2/2011 Wilkerson
7,906,921 B2 3/2011 Wang et al.
7,922,024 B2 4/2011 Yang et al.
7,950,543 B2 5/2011 Yang et al.
8,297,470 B2 10/2012 Yang et al.
8,418,869 B2 4/2013 Yang et al.
8,456,120 B2 6/2013 Wang
8,567,630 B2 10/2013 Yang et al.
8,569,980 B2 10/2013 Yang et al.
8,686,676 B2 4/2014 Yang et al.
8,716,969 B2 5/2014 Yang et al.
8,720,728 B2 5/2014 Yang et al.
8,766,582 B2 * 7/2014 Yang ..................... B65F 1/1638 220/244
8,872,459 B2 10/2014 Yang et al.
9,051,093 B2 6/2015 Yang et al.
9,284,766 B2 * 3/2016 Wenzel ................. E05F 15/603
9,434,538 B2 9/2016 Yang et al.
9,481,515 B2 11/2016 Yang et al.
9,573,759 B2 2/2017 Yang et al.
9,586,755 B1 3/2017 Yang et al.
9,751,692 B2 9/2017 Yang et al.
9,790,025 B2 10/2017 Yang et al.
9,856,080 B2 1/2018 Yang et al.
10,279,996 B2 5/2019 Yang et al.
10,279,997 B2 5/2019 Yang et al.
10,413,064 B1 * 9/2019 Lu ........................ A47B 88/457
10,472,170 B2 11/2019 Yang et al.
10,494,175 B2 12/2019 Yang et al.
10,654,648 B1 5/2020 Rodriguez
10,683,165 B2 6/2020 Yang et al.
10,723,549 B2 7/2020 Yang et al.
11,027,916 B2 6/2021 Yang et al.
11,136,186 B2 10/2021 Yang et al.
2001/0013745 A1 * 8/2001 Fulterer ............... H03K 17/968 312/319.9
2001/0045512 A1 11/2001 Brent
2002/0092853 A1 7/2002 Wang
2002/0104266 A1 8/2002 Ranaudo
2003/0205979 A1 * 11/2003 Papari ................... B65F 1/1638 318/466
2004/0020927 A1 2/2004 Yang et al.
2004/0140782 A1 7/2004 Okabe et al.
2004/0174268 A1 9/2004 Scott et al.
2004/0199401 A1 10/2004 Wagner
2004/0251746 A1 12/2004 Ichimaru et al.
2005/0258794 A1 * 11/2005 Fukuizumi ............ B65F 1/1638 318/480
2006/0196874 A1 9/2006 Yang
2006/0255033 A1 * 11/2006 Yang ..................... B65F 1/1638 220/211
2007/0114847 A1 5/2007 Ichimaru et al.
2007/0182551 A1 8/2007 Yang et al.
2007/0209846 A1 9/2007 Wilson
2007/0266637 A1 11/2007 McGowan
2007/0272691 A1 11/2007 Wang et al.
2008/0083627 A1 4/2008 Hamm
2008/0164257 A1 7/2008 Boll et al.
2008/0236275 A1 10/2008 Breed et al.
2009/0008888 A1 1/2009 Boulden
2009/0071959 A1 3/2009 Cheung
2009/0084788 A1 4/2009 Yang et al.
2009/0194532 A1 * 8/2009 Yang ..................... B65F 1/1638 220/211
2009/0261105 A1 10/2009 Cunningham et al.
2010/0006572 A1 1/2010 Chiou
2010/0147865 A1 6/2010 Yang et al.
2010/0170904 A1 7/2010 Kalman et al.
2010/0219191 A1 9/2010 Prosa
2010/0237074 A1 9/2010 Yang et al.
2011/0017735 A1 1/2011 Wang et al.
2011/0049149 A1 * 3/2011 Shih ...................... B65F 1/1607 220/260
2011/0056952 A1 3/2011 Borowski et al.
2011/0156560 A1 * 6/2011 Michael .................. E05B 47/00 312/319.1
2011/0220646 A1 9/2011 Yang et al.
2011/0220647 A1 9/2011 Yang et al.
2011/0220648 A1 9/2011 Yang et al.
2012/0145932 A1 6/2012 Yao et al.
2013/0002100 A1 * 1/2013 Badri .................... B65F 1/1436 312/212
2015/0028751 A1 1/2015 Dobbins
2015/0213705 A1 7/2015 Ehrman et al.
2015/0251849 A1 9/2015 Yang et al.
2016/0035209 A1 2/2016 Martin et al.

(56) References Cited

U.S. PATENT DOCUMENTS

| | | | | |
|---|---|---|---|---|
| 2016/0162832 | A1 | 6/2016 | Thompson et al. | |
| 2016/0239795 | A1 | 8/2016 | Burch, V et al. | |
| 2017/0052613 | A1 | 2/2017 | Alameh et al. | |
| 2017/0096299 | A1 | 4/2017 | Yang et al. | |
| 2019/0169930 | A1 * | 6/2019 | Niemiec | A47B 88/413 |
| 2019/0185263 | A1 | 6/2019 | Yang et al. | |
| 2019/0276232 | A1 | 9/2019 | Yang et al. | |
| 2022/0153517 | A1 * | 5/2022 | Wilhelmsen | B65F 1/1405 |
| 2022/0375320 | A1 | 11/2022 | Thompson et al. | |

FOREIGN PATENT DOCUMENTS

| | | | | | |
|---|---|---|---|---|---|
| CN | 106690938 | A | * | 5/2017 | |
| CN | 107495686 | A | * | 12/2017 | |
| CN | 109775193 | A | * | 5/2019 | |
| DE | 19824941 | A1 | * | 12/1999 | B65F 1/006 |
| DE | 10036259 | A1 | | 11/2001 | |
| DE | 10305311 | A1 | * | 8/2004 | A47B 77/06 |
| DE | 202009016101 | U1 | * | 4/2011 | A47B 88/457 |
| DE | 102017114984 | A1 | * | 1/2018 | A47L 15/4257 |
| EP | 0903305 | A1 | | 3/1999 | |
| EP | 1193690 | A1 | | 4/2002 | |
| EP | 1508537 | A1 | * | 2/2005 | A47B 77/18 |
| EP | 1600373 | A2 | | 11/2005 | |
| EP | 1647503 | A1 | | 4/2006 | |
| EP | 1918223 | A1 | | 5/2008 | |
| EP | 2387911 | A1 | | 11/2011 | |
| EP | 3167789 | A1 | * | 5/2017 | A47L 15/0049 |
| GB | 2559346 | A | * | 8/2018 | A47B 77/08 |
| JP | 02-152670 | | | 6/1990 | |
| JP | 2004-106713 | | | 4/2004 | |
| JP | 2004-231237 | | | 8/2004 | |
| JP | 2020143829 | A | * | 9/2020 | |
| WO | WO 2006/079263 | A1 | | 8/2006 | |
| WO | WO 2007/139570 | | | 12/2007 | |
| WO | WO 2015/134902 | A1 | | 9/2015 | |
| WO | WO 2015/138625 | A1 | | 9/2015 | |
| WO | WO 2016/054109 | A1 | | 4/2016 | |
| WO | WO-2016133407 | A1 | * | 8/2016 | A47B 77/18 |
| WO | WO-2021180516 | A1 | * | 9/2021 | |

OTHER PUBLICATIONS

YouTube.com, "trash pullout with servo drive installed", dated Jun. 17, 2011, https://www.youtube.com/watch?v=tO1SbtllEh8, entire video, including screenshots in 3 pages.

* cited by examiner

BUILT-IN ELECTRONICALLY MOVABLE WASTE RECEPTACLES

REFERENCE TO RELATED APPLICATIONS

This application claims the benefit of U.S. Provisional Application No. 63/118,616 filed Nov. 25, 2020 and U.S. Provisional Application No. 63/119,469 filed Nov. 30, 2020. This application hereby incorporates by reference the above-identified provisional applications in their entireties.

BACKGROUND

Field

This disclosure relates generally to waste receptacles and specifically to electronically enabled waste receptacles.

Description of the Related Art

The convenient and sanitary collection and disposal of household waste has been a challenge throughout human history. In modern homes, some waste receptacles are portable and free-standing, while others are built into a permanent structure of the home such as a cabinet. Some portable trashcans include electronically enabled lids that automatically open when a user approaches with trash; however, portable trashcans take up space inside the room, which can be especially challenging in small kitchen areas. Built-in trashcan systems do not take up space in the room, but they require moving the trashcan from within the cabinet to a position in the room outside of the cabinet where an opening at the top of the trashcan can be accessed. Built-in trashcans do not open automatically when a user approaches with trash because they are sequestered inside of a cabinet, unable to sense a user approaching.

SUMMARY

This disclosure includes a description of various embodiments of waste-receiving systems. In some embodiments, a waste-receiving system comprises at least one waste receptacle configured to be positioned inside of a cabinet, an electric drive system configured to transition the waste-receiving system from a retracted or closed position within a closed cabinet to an extended or open position that provides access to the waste receptacle inside of the waste-receiving system, such as by moving the waste receptacle at least partially outside of the cabinet or opening a cabinet door or access region. The system can include a sensor system configured to generate one or more electronic signals from an environment, such as from a user, and a processor in electronic communication with the sensor system and a motor, the processor configured to actuate the motor based at least in part on the one or more electronic signals received from the sensor system. In some embodiments, the waste-receiving system may further comprise a cabinet. In some embodiments, the waste-receiving system may have at least one waste receptacle that is supported by a holder. In some embodiments, the waste-receiving system can have a drive system that is configured to move the at least one receptacle by moving the holder.

In some embodiments, the waste-receiving system has a holder that comprises a front bracket. The front bracket can be configured to receive or hold a cabinet door. The bracket can be configured to move with the at least one waste receptacle. The waste-receiving system can include a sensor system, the sensor system can comprise a light-based sensor. The light-based sensor can be an infrared sensor. In some embodiments, the sensor system can comprise a microphone. In some embodiments, the sensor system can be mounted in the cabinet door.

In some embodiments, the waste-receiving system can include a plurality of waste receptacles. The waste-receiving system can further comprise a lid configured to cover the at least one waste receptacle, such as in the closed or retracted position. The lid can have an insert. In some embodiments, the insert can move relative to at least one other component of the lid. In some embodiments, the insert can move to open an aperture extending through to the at least one waste receptacle. In some embodiments, the waste-receiving system can have a lid that is configured to open as the at least one waste receptacle moves from the retracted position to the extended position.

In some embodiments, the waste-receiving system has a processor that is configured to use the one or more electronic signals from the sensor system to control the drive system in order to avoid a collision with the holder as the drive system moves the at least one waste receptacle from the retracted position to the extended position or as the door to the waste-receiving system is opened.

In some embodiments, the waste-receiving system comprises a receptacle-movement system comprising a rail system. The rail system can comprise a first rail and a second rail. The first rail can comprise a plurality of tracks positioned on an interior surface of the first rail. The second rail can comprise a plurality of moving components such as one or more tracks and wheels positioned on one or more interior-facing surfaces of the second rail. In some embodiments, the one or more wheels are included on first rail and/or the second rail. In some embodiments, the plurality of moving components (e.g., tracks and/or wheels) are not visible by a user in normal use. The tracks may have grooves facing towards a central axial or longitudinal line of the waste-receiving system. In some embodiments, an exterior surface of the first rail is generally smooth and an exterior surface of the second rail is generally smooth.

In some embodiments, the holder comprises an upper surface on which a lower region of the at least one waste receptacle is supported. In some embodiments, the waste-receiving system can have a holder that comprises one or more recesses configured to closely or tightly receive the at least one waste receptacle. The one or more recesses can be configured to resist moving or tipping of the at least one waste receptacle as the drive system moves the at least one waste receptacle from the retracted position to the extended position.

In some embodiments, the drive system comprises an electric motor. In some embodiments, the drive system comprises a solenoid. In some embodiments, the drive system can comprise a drive chain or drive belt.

In some embodiments, the waste-receiving system can have a drive system that comprises a clutch configured to selectively permit the electric motor to move the holder. In some embodiments, the clutch can be configured to disengage the electric motor from the holder when the holder encounters an obstruction, an opposing force, or an overrunning force. The clutch can be a bidirectional clutch.

In some embodiments, a trashcan comprises a container configured to receive trash, an electric motor, an electronic sensor configured to generate one or more electronic sensor signals, and a processor configured to use the one or more electronic sensor signals to determine when to selectively rotate the motor in order to move a movable component of the trashcan. In some embodiments, the trashcan can have a bidirectional clutch functionally positioned between the electric motor and the movable component. The clutch can comprise a circular engagement surface with an engaged position and a disengaged position, the engagement surface having a larger diameter in the engaged position than in the disengaged position.

In some embodiments, the trashcan can have an engagement surface that is biased toward the disengaged position. In some embodiments, the engagement surface comprises an open interior region. In some embodiments, the open interior region of the engagement surface is configured to engage a rotatable driver functionally coupled with the electric motor. The shape of an outer perimeter of the rotatable driver can generally match the shape of an inner perimeter of the open interior region of the engagement surface in the disengaged position. In some embodiments, the shape of the outer perimeter of the rotatable driver does not generally match the shape of the inner perimeter of the open interior region of the engagement surface in the engaged position.

In some embodiments, the rotatable driver is configured to convey a torque from the engagement surface to a holder driver when the engagement surface is in the engaged position and the rotatable driver is configured to not convey a torque from the engagement surface to the holder driver when the engagement surface is in the disengaged position.

In some embodiments, the holder driver is an elastomeric wheel positioned within a base portion of the trashcan and the holder driver is configured to convert rotational motion from the electric motor to generally linear motion of the trashcan along a rail.

BRIEF DESCRIPTION OF THE DRAWINGS

These drawings are schematic, showing some examples of basic parts and concepts. Many different or additional structures, implementations, components, mechanisms, steps, and processes can be used. The claimed inventions should not be limited in any way to anything illustrated in the drawings.

DETAILED DESCRIPTION

Figure 1A:
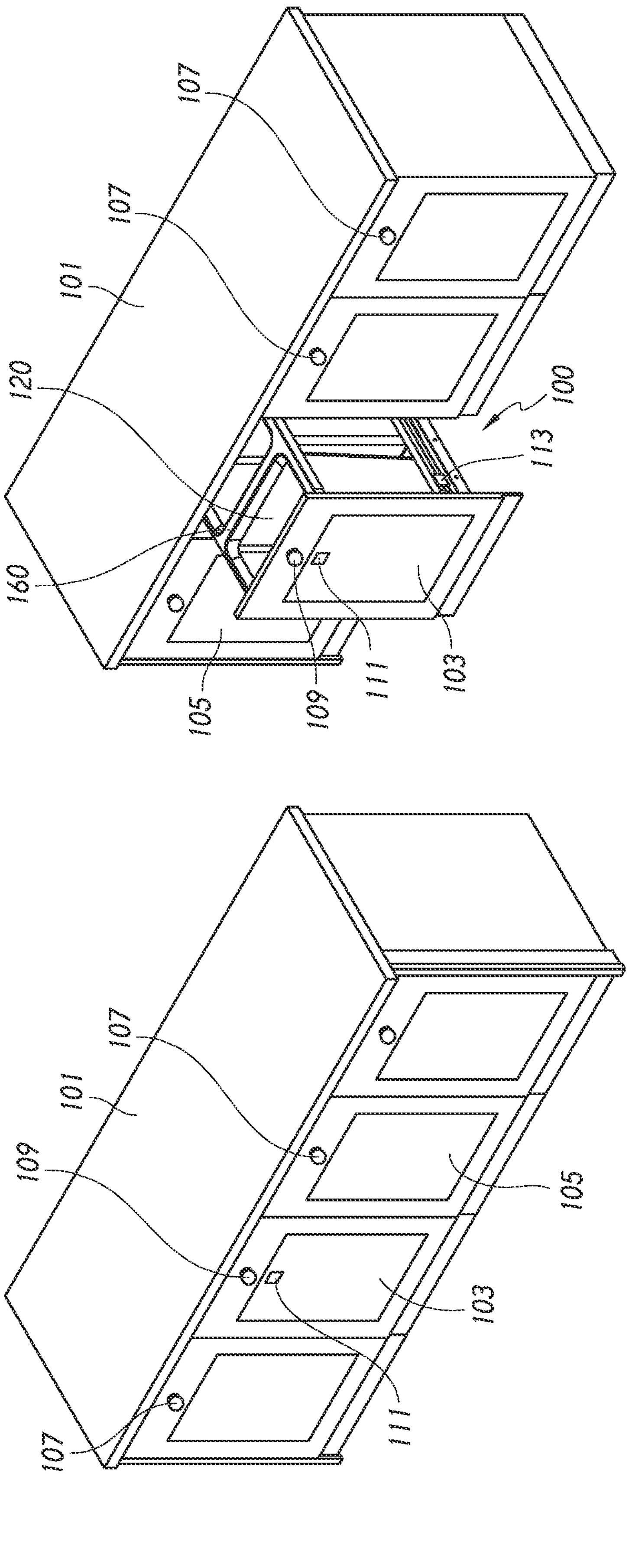
FIG. 1A is a front perspective view of an example of a cabinet with an in-cabinet electronically movable waste-receiving system in a closed position and in an open position.

This specification provides textual descriptions and illustrations of many devices. Any structure, material, function, method, or step that is described and/or illustrated in one example can be used by itself or with or instead of any structure, material, function, method or step that is described and/or illustrated in another example or used in this field. The text and drawings merely provide examples and should not be interpreted as limiting or exclusive. No feature disclosed in this application is considered critical or indispensable. The relative sizes and proportions of the components illustrated in the drawings form part of the supporting disclosure of this specification, but should not be considered to limit any claim unless recited in such claim.

As illustrated in FIG. 1A, a waste-receiving system 100 can be configured to be placed securely within a permanent or semi-permanent fixture within a building, such as within a dwelling (e.g., a house or apartment), or within a commercial or industrial building, within a school, or within any other type of building. The permanent or semi-permanent fixture can be a cabinet 101, as shown. In some embodiments, the waste-receiving system 100 can comprise a movable outer cover or door 103 that can be similar or identical in appearance to one or more other outer doors 105 of the cabinet 101 that are adjacent or close to the movable outer cover or door 103. The movable outer cover or door 103 can have approximately the same dimensions of one or more of the other outer doors 105. The movable outer cover or door 103 can be generally about the same height, width, and/or length as one or more other outer doors 105. The movable outer cover or door 103 can include one or more appearance features that are generally or substantially the same as or similar to those of the other outer doors 105, such as one or more contours, shapes, bevels, colors, stains, grains, wood types, handles, knobs, insets, etc., that are generally or substantially the same or similar. The waste-receiving system 100 can include a bracket or region of attachment configured to receive and securely hold the cover or door 103.

The other outer doors 105 of the cabinet 101 can include one or more conventional grasping devices 107 such as one or more protrusions (e.g., handles, knobs, etc.) or recesses as shown. The movable outer cover or door 103 or outer interface of the waste-receiving system 100 can include one or more user-communicators such as user-communication devices 109 which can comprise a grasping device, such as a handle or knob, that can be similar or identical in appearance to the grasping devices 107 of the other outer doors 105, or another device configured to contact, sense, and/or communicate with a user, such as a pedal. The one or more user-communication devices 109 can be actuated in any useful way, such as by enabling a user to manually open the movable outer cover 103, to pull the movable outer cover 103 into the room such that the waste-receiving system 100 can be transitioned from the closed or retracted position to the open or extended position under the force of the user's action, and/or to sense the presence of a user (e.g., by sensing a user's foot positioned near, underneath, and/or behind a front cabinet door 103). In some embodiments, there is no electronic actuator or sensor visible from outside of the waste-receiving system 100 when in the closed position in normal use, which can help to preserve a normal or traditional look or ambiance for a room. Alternatively or additionally, the one or more user-communication devices 109 can comprise an electronic actuator, such as a switch, touch sensor, proximity sensor, transducer, and/or microphone, etc., that is configured to communicate with a user, such as by touch or sound, and to generate an electronic signal that is communicated to an electronic processor or controller in the waste-receiving system which can cause the waste-receiving system to automatically move under the influence of the electric motor 164 from the closed to the open position and/or from the open position to the closed position.

The waste-receiving system 100 can be configured to enable one or more of the user-communication devices 109 to allow the user to indicate to the processor that the waste-receiving system 100 should remain in an open state for an extended period and/or until the user indicates that the waste-receiving system 100 can return to a closed state. For example, when the user touches or actuates one or more of the user-communications devices 109, and/or the user hyper extends or pulls or pushes the waste-receiving system 100 into an open or extended state, the waste-receiving system 100 can stay in the open or extended state until the user closes the waste-receiving system 100 or an automated timer can be triggered causing the waste-receiving system 100 to automatically close after a predetermined time (for example, after at least about three, four, or five minutes). When locking the waste-receiving system 100 in an open state, the user can remove trash, clean the receptacle(s) 120, or conduct any other necessary activity with the waste-receiving system 100 open.

In some embodiments, the waste-receiving system 100 has one or more opening-actuation sensors 111 positioned on an exterior, room-facing, and/or forward-facing surface of the waste-receiving system 100, such as on an outer surface of the movable outer cover or door 103, as shown. The exterior, room-facing, and/or forward-facing surface can be oriented to face in the direction of motion of the waste-receiving system 100 as it transitions between the closed or retracted position and the open or extended position. Any sensor, transducer, processor, controller, step, and/or algorithm that is disclosed and/or illustrated anywhere in U.S. Pat. No. 9,856,080, which is incorporated by reference in this specification in its entirety, can be used with or instead of any sensor, transducer, processor, controller, step, and/or algorithm in this specification. In some embodiments, information or data that is generated by the one or more sensors 111 and communicated to a processor or controller of the waste-receiving system 100 can be used to determine when the motor 164 should be used to convey the waste receptacles 120 into an open position, when the motor 164 should be used to convey the waste receptacles 120 into a closed position, and/or when the motor 164 should stop and start. An algorithm provided in software or hardware in an electronic memory of the waste-receiving system can determine how the motor 164 is controlled based on data received from sensors. For example, in some embodiments, the waste-receiving system 100 can be configured to advance one or more waste receptacles 120 from the closed or retracted position to the open or extended position when the one or more sensors 111 detect that a user is present, near, and/or moving toward or in the direction of the waste-receiving system 100 and/or when the one or more sensors 111 detect that a user has given a predetermined audio signal such as a voice command. The waste-receiving system 100 can be configured to maintain the one or more waste receptacles 120 in the open or extended position for a predetermined amount of time (e.g., at least about 30 seconds) and/or until the one or more sensors 111 no longer detect that a user is present or near the waste-receiving system 100 and/or until the user touches a sensor and/or until the user moves the waste-receiving system by a small amount and/or until the user gives a predetermined audio signal such as a voice command, at which point the waste-receiving system 100 can be configured to move the one or more waste receptacles 120 back into the closed or retracted position. For example, a motor (e.g., motor 164 discussed herein) can provide the power or force to close the waste-receiving system 100 by advancing it back into the cabinet. Human force is not necessary or required to close the waste-receiving system 100. In some embodiments, the one or more sensors 111 can be configured to detect the user's presence and actuate the waste-receiving system 100 without requiring the user to perform any additional movement besides simply moving toward or being present in front of the waste-receiving system 100. For example, the one or more sensors 111 need not (but can if desired) be configured to require the user to wave, swipe, push a button, or otherwise move in any additional or other way to actuate the waste-receiving system 100 to move from the closed to the open position and/or to move from the open position to the closed position.

As illustrated, the waste-receiving system 100 can comprise a movement-monitoring system comprising one or more movement-monitoring sensors 113 and the processor or controller of the waste-receiving system 100. In some embodiments, as shown, the one or more movement-monitoring sensors 113 can be positioned on one or more lateral sides of the waste-receiving system 100, or on or in any other suitable surface or component of the waste-receiving system 100. The one or more opening-actuation sensors 111 can be positioned on a surface that is generally perpendicular or orthogonal to the surface on which the movement-monitoring sensors 113 are positioned, as illustrated. The one or more opening-actuating sensors 111 can be configured to detect movement or the presence of obstacles in a different dimension or direction than the opening-actuation sensors 111. In some embodiments, the one or more opening-actuation sensors 111 can be or can form part of the movement-monitoring system.

In some embodiments, the sensors 111 can be an accelerometer 111. The accelerometer 111 can be positioned on the front of the door 103, within the door 103, on the inside surface of the door 103, or in any other location on or within the waste-receiving system 100. The accelerometer 111 can be used to detect when the advancing door encounters one or more obstructions, for example, a person or object in front of the door 103, and/or when a user has manually moved the door, such as by grasping a handle or knob on the door and pushing or pulling it. The accelerometer 111 can be configured to generate a signal that can be used to stop the motor (e.g., motor 164) if an obstruction and/or movement of the door by a user is detected. In some embodiments, the accelerometer 111 can obviate the need for a clutch (e.g., clutch 176). The accelerometer 111 can assist in manual opening of the waste-receiving system 100 by generating a signal to cause the motor to stop and/or to reverse direction.

In FIG. 1A, one movement-monitoring sensor 113 is positioned on the right side of the waste-receiving system 100 and another movement-monitoring sensor 113 is position on the left side of the waste-receiving system 100 (not shown in the view provided). As the waste-receiving system 100 moves from the retracted or closed position to the extended or open position, the movement-monitoring system can continuously or intermittently receive information from one or more of the movement-monitoring sensors 113 about whether the extending or opening of the waste-receiving system into the room can begin or continue to proceed safely, such as without contacting or hitting or moving into a path of movement of something or someone in the room. If an algorithm in the movement-monitoring system determines from information or data received by one or more of the movement-monitoring sensors 113 that the waste-receiving system is likely to hit or be hit by an obstacle in the room, the movement-monitoring system can cause the waste-receiving system 100 to stop moving and/or to retract or close at the same speed or at an increased speed as compared to the speed at which the waste-receiving system 100 was extending out or opening.

When the waste-receiving system 100 encounters or senses resistance to any movement (e.g., opening, moving outward into the extended position, closing, moving inward to the retracted position), an algorithm in an electronic memory and/or in the processor or controller of the waste-receiving system 100 can determine whether to continue moving, to stop, to move in the same direction at a slower speed, and/or to move in an opposite direction at the same speed, a slower speed, or an increased speed. In some embodiments, the resistance to movement can be sensed by an increase in the electrical power drawn into or required to actuate the electric motor 164 and/or by a decrease in the speed or rotational velocity (e.g., rotations per minute or RPM) of the electric motor 164 or any other moving part of the waste-receiving system 100. The determination made by the algorithm of the processor or controller can be influenced by the magnitude and/or pattern of the sensed resistance. The processor or controller can communicate with or send a signal or a series of signals to the electric motor 164 to stop or to perform the one or more other movements determined appropriate by the processor or controller. The detection of and response to resistance detected by the waste-receiving system 100 can help to avoid damage or excessive wear to the waste-receiving system 100 or other objects, pets, or people.

The waste-receiving system 100 can be configured to communicate with a separate electronic device, such as through a wired or wireless connection (e.g., Wi-Fi, Bluetooth, etc.) The separate electronic device can be a generally stationary device, such as a desktop computer, a server, a router, etc., and/or a mobile electronic device such as a mobile phone, laptop computer, tablet computer, etc. An algorithm in software, firmware, or an app on the separate electronic device can communicate with, receiving information from, and/or control movement of or settings in the processor or controller of the waste-receiving system 100. For example, the separate electronic device can communicate with the waste-receiving system 100 to determine the speed of any movement of the waste-receiving system, the amount of time that it stays open, the sensitivity of the sensors (e.g., whether to trigger an opening action when a user is within a first distance, such as a foot, or within a second distance that is larger than the first distance, such two feet, etc.). In some embodiments, the waste-receiving system 100 can communicate to the separate electronic device how often the waste-receiving system 100 is being opened and closed over a certain period of time, whether the contents (e.g., trash) inside of the receptacle have accumulated to the point of substantially filling the receptacle and needing to be removed, whether an onboard supply of one or more reusable supplies (e.g., trash bags) has been substantially used up and needs to be replenished, etc.

Figure 1B:
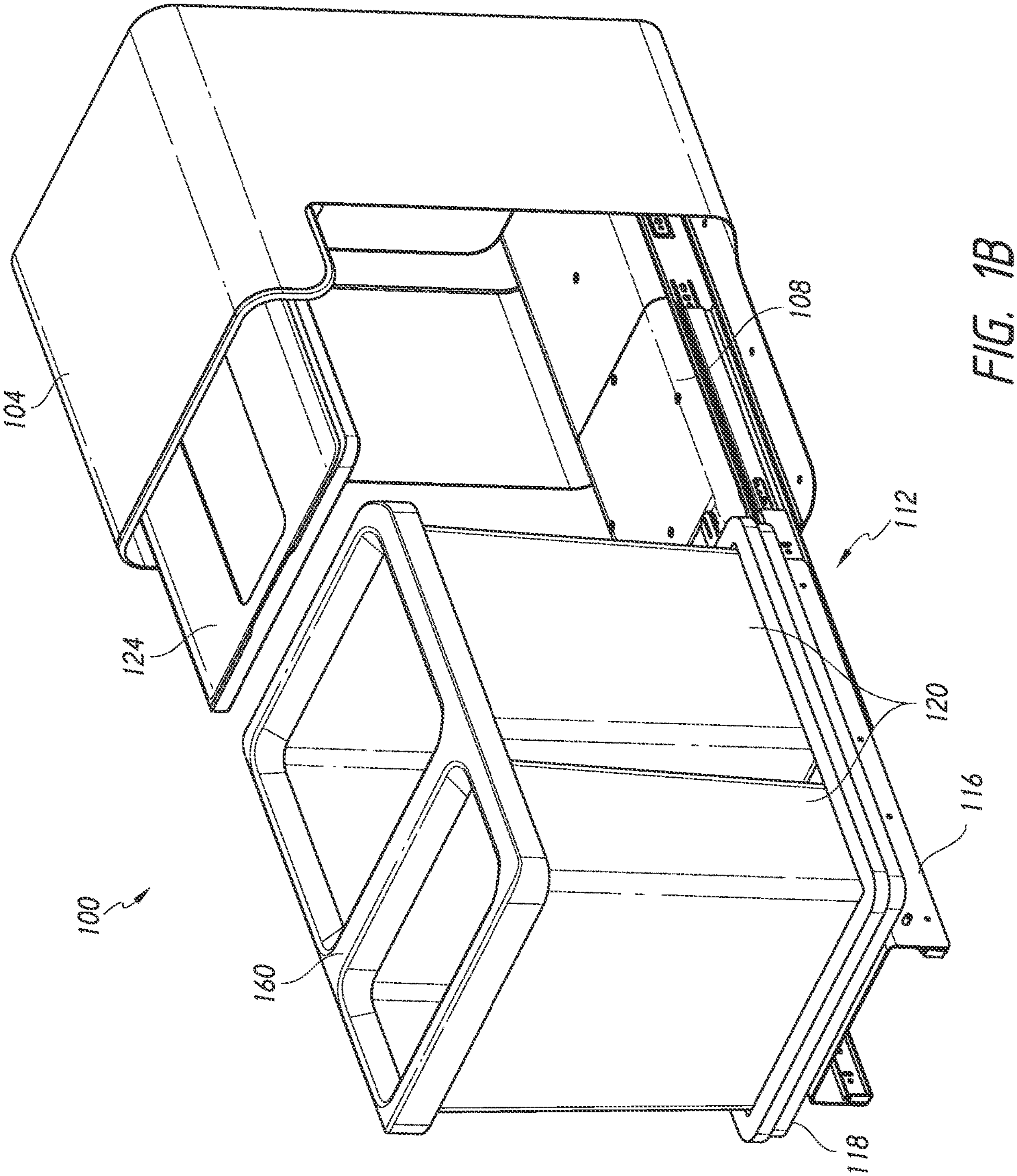
FIG. 1B is a front perspective view of the in-cabinet electronically movable waste-receiving system FIG. 1A, shown separate from the cabinet.

In some embodiments, as shown in FIG. 1B, the waste-receiving system 100 includes a casing 104. The casing 104 can be configured to fit snuggly, securely, and/or tightly within a range of standard sized kitchen cabinets, such as at least about 13 inches wide and/or less than or equal to about 16 inches wide, at least about 19 inches in height and/or less than or equal to about 27 inches in height, and/or at least about 20 inches deep and/or less than or equal to about 30 inches deep. In some embodiments, the waste-receiving system 100 is configured to replace an existing cabinet structure (e.g., internal shelving) such that the existing structure can be removed and the casing can be inserted. In some embodiments, a series of casing 104 sizes can be provided for cabinets with different dimensions. Shims or one or more adjustable side, top, bottom, or rear brackets can be used in appropriate situations to allow a casing that is slightly or somewhat smaller than an existing internal cabinet cavity to fit and be attached securely, tightly, and/or snuggly within the cavity. In some embodiments, the casing 104 can be specially sized for the dimensions of a particular cabinet. In some embodiments, the casing 104 can comprise at least two, three, or four sides that can be configured to attach to at least two, three, or four sides within the cabinet space.

In some embodiments, the casing 104 can have a generally annular shape or at least a portion of the casing 104 can form a generally closed loop. The casing 104 can comprise a top portion, a bottom portion, a first side portion, and a second side portion. As shown, the bottom portion of the casing 104 may extend further towards a front end of a cabinet as compared to the top portion, first side portion, and second side portion. In some embodiments, the casing 104 can comprise an outer periphery of the waste-receiving system 100 that is wider and taller than all other portions of the waste-receiving system 100 before installation, such that when retracted, all other components of the waste-receiving system 100 can fit inside, or within the profile of the width and/or height the casing 104 as illustrated. In some embodiments, the casing 104 may not be wider or taller than other portions of the waste-receiving system 100, but may be any structure, such as a bracket, for enabling the waste-receiving system 100 to attach to an interior space or structure of a cabinet. The casing may, but is not required to, surround all or a portion of the waste-receiving system 100. In some embodiments, the casing 104 can quickly and easily be detachable from the other components of the waste-receiving system 100, such as even without the use of tools, to help facilitate installation and/or cleaning. The casing 104 can include brackets, apertures, and/or other features to facilitate tight, snug, secure, and/or close attachment or affixing of the casing 104 inside of a cabinet space. For example, in some embodiments as shown, the casing can be shaped or structured to be attachable to at least two different surfaces inside of a cabinet space, such as at least two opposing surfaces (e.g., left and right walls, top and bottom walls, etc.) or at least two perpendicular surfaces (e.g., a bottom wall and a side wall, a top wall and a side wall, etc.) When the casing 104 is detached from one or more or all other components of the waste-receiving system 100, an installation worker can easily reach inside of the casing 104 to secure or affix the casing 104 to the interior of the cabinet space on at least one, two, three, and/or four sides and then attach or reattach the other components of the waste-receiving system 100 to and/or within the casing 104.

As illustrated in FIG. 1B, two or more or all of the casing 104, the base 108, the movable portion 116, the one or more receptacles 120, the waste receptacle lid 124, and/or the electric motor 164, can be combined into an integral or unitary structure that is joined together such that it can be conveniently shipped, transported, and/or installed as a unit. One or more parts of the integral or unitary structure of the waste-receiving system 100, including any of the parts mentioned here, can be temporarily removed from each other for convenience in installation, service, repair, and/or cleaning.

A base 108 can be removably fastened to the casing 104. The bottom surface of the base 108 can be attached to an inner bottom surface of the casing 104. In some embodiments, a translating mechanism is affixed to the base 108. In some embodiments, as shown, the translating mechanism can be a rail system. The rail system can be sliding rails 112. The translating mechanism can be affixed to a first side and second side of the base 108. The translating mechanism 112 can be connected to a movable portion 116. The movable portion 116 can be configured to carry one or more waste receptacles 120. The various waste receptacles 120 can vary in size and shape.

The waste-receiving system 100 can further include a waste receptacle lid 124. The waste receptacle lid 124 can be configured to close the one or more waste receptacles 120. The lid 124 can help to contain or diminish unwanted smells or vapors within the one or more waste receptacles 120 when the waste-receiving system 100 is in the retracted or closed position. The waste receptacle lid 124 can be configured to move relative to the one or more waste receptacles 120 automatically as the waste-receiving system 100 moves from the closed or retracted position to the open or extended position and/or from the open or extended position to the closed or retracted position. In some embodiments, the opening and closing of the lid 124 can occur mechanically without any electrical assistance. In some embodiments, the opening and closing of the lid 124 can be performed with the use of one or more electrical motors, electrical solenoids, and/or electrical linear actuators.

Figure 1C:
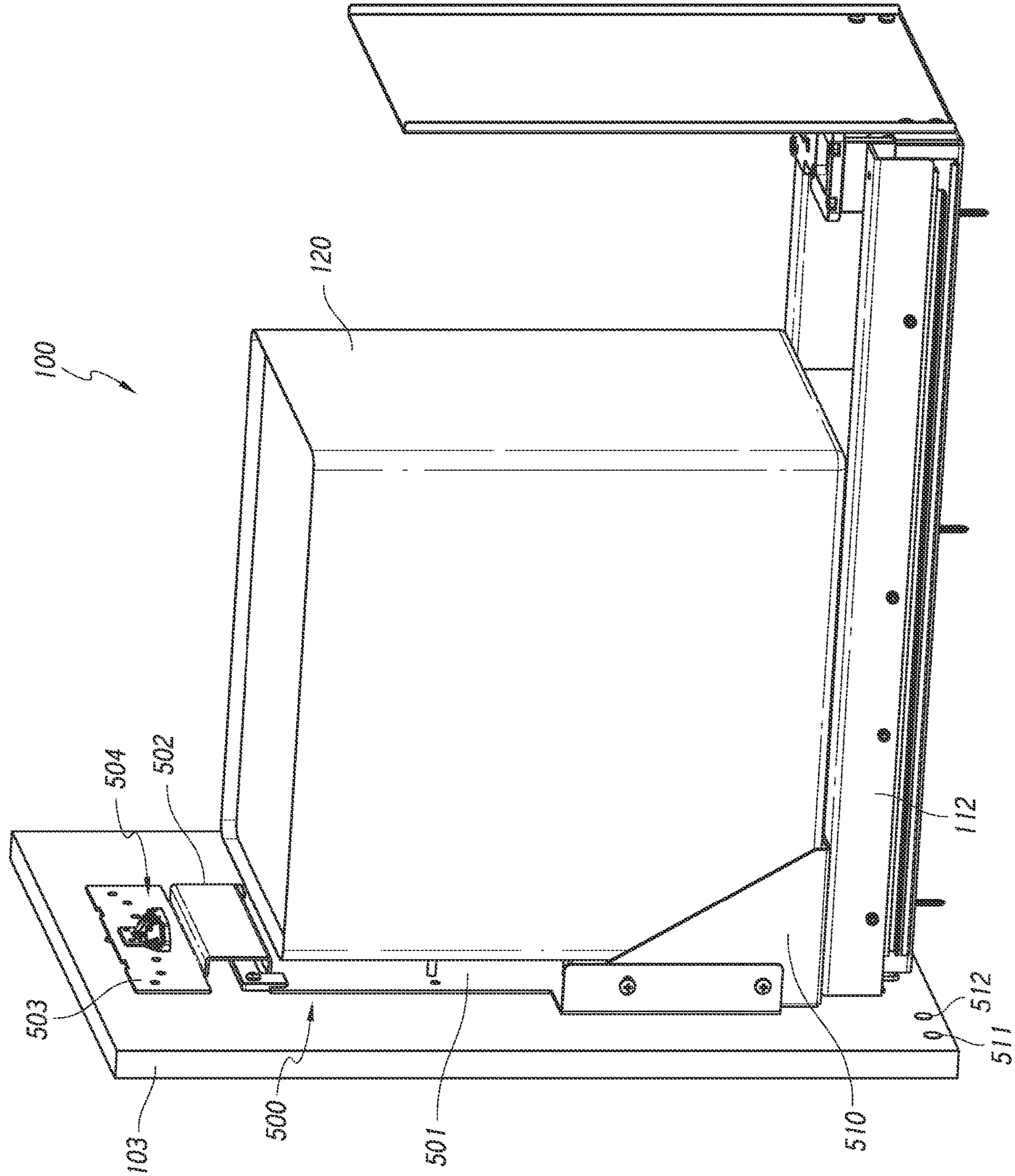
FIG. 1C is a side perspective view of an embodiment of an in-cabinet electronically movable waste-receiving system.

FIG. 1C shows an embodiment of a waste-receiving system 100. In some embodiments, the outer cover or door 103 can be connected to the waste-receiving system 100 via a mount 500. The mount 500 can include a first mount portion 501 that is coupled to the door 103. The first mount portion 501 can be coupled to a second mount portion 510 that is connected to or above the sliding rails 112.

The waste-receiving system 100 can include a sensor mount 504. The sensor mount 504 can be positioned on the inside side of the cover or door 103. The sensor mount 504 can be connected to a mounting plate 503 that is connected to the inside of the door 103. The mounting plate 503 can be connected to the mount 500 via a connecting plate 502.

Figure 1D:
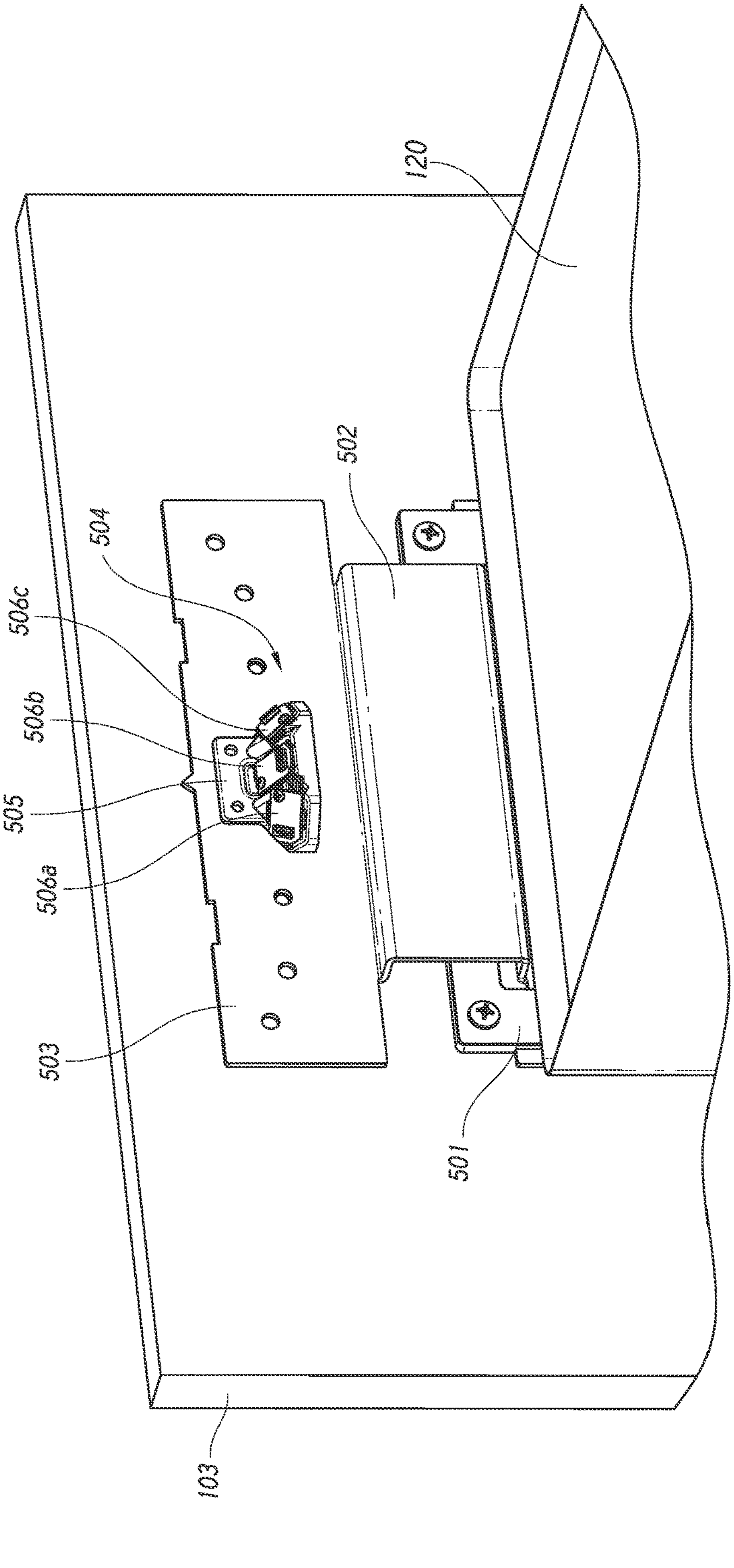
FIG. 1D is a perspective view of a sensor mount connected to a cabinet door of an embodiment of an in-cabinet electronically movable waste-receiving system.
Figure 2:
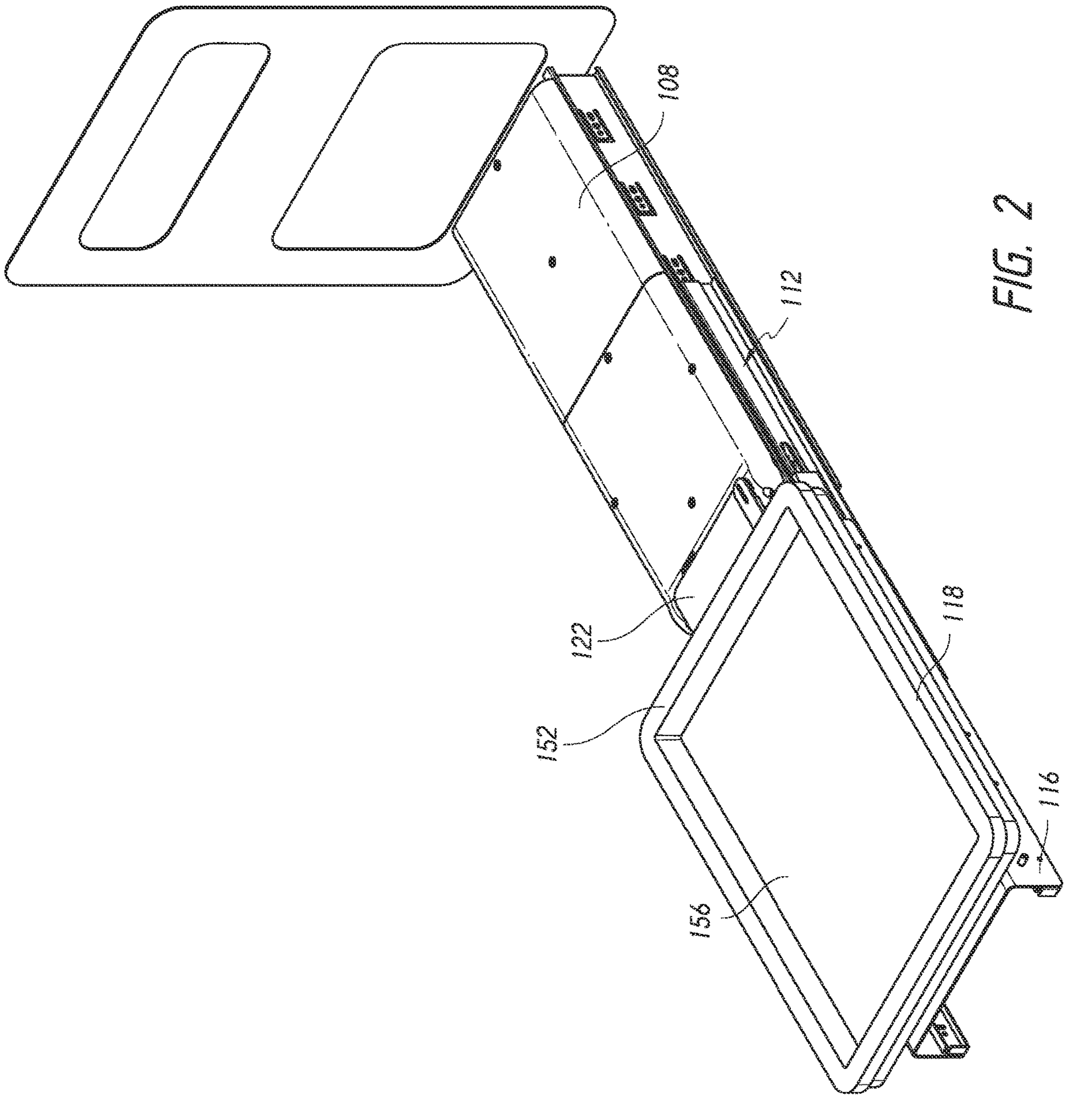
FIG. 2 is an illustration of a portion of an in-cabinet electronically movable waste receptacle of FIG. 1B depicting a lower portion of the system.
Figure 3:
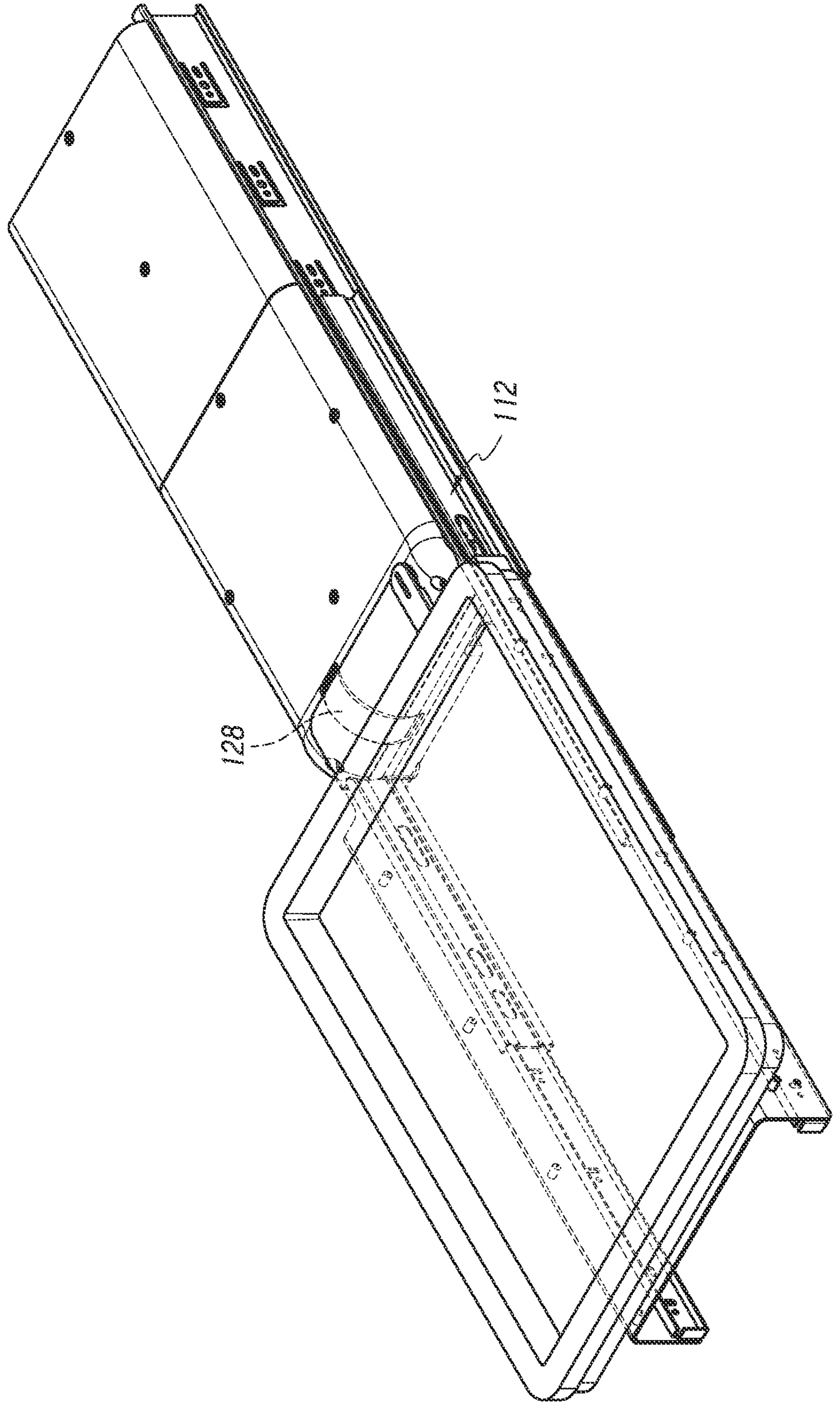
FIG. 3 is an illustration of a portion of an in-cabinet electronically movable waste receptacle of FIG. 1B depicting a lower portion of the system with some parts made transparent.
Figure 4:
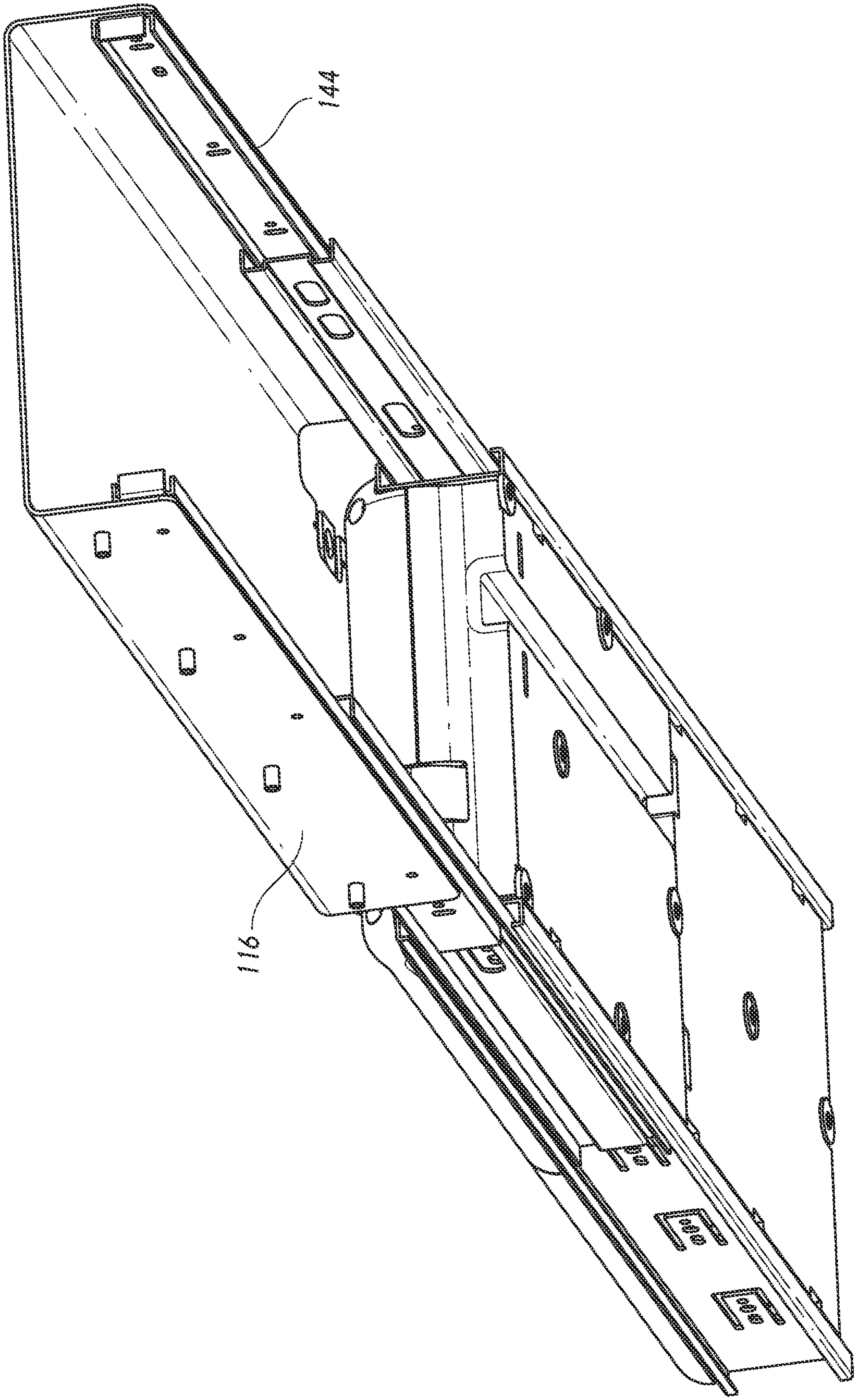
FIG. 4 is an illustration of a portion of an in-cabinet electronically movable waste receptacle of FIG. 1B depicting a lower portion of the system.
Figure 5:
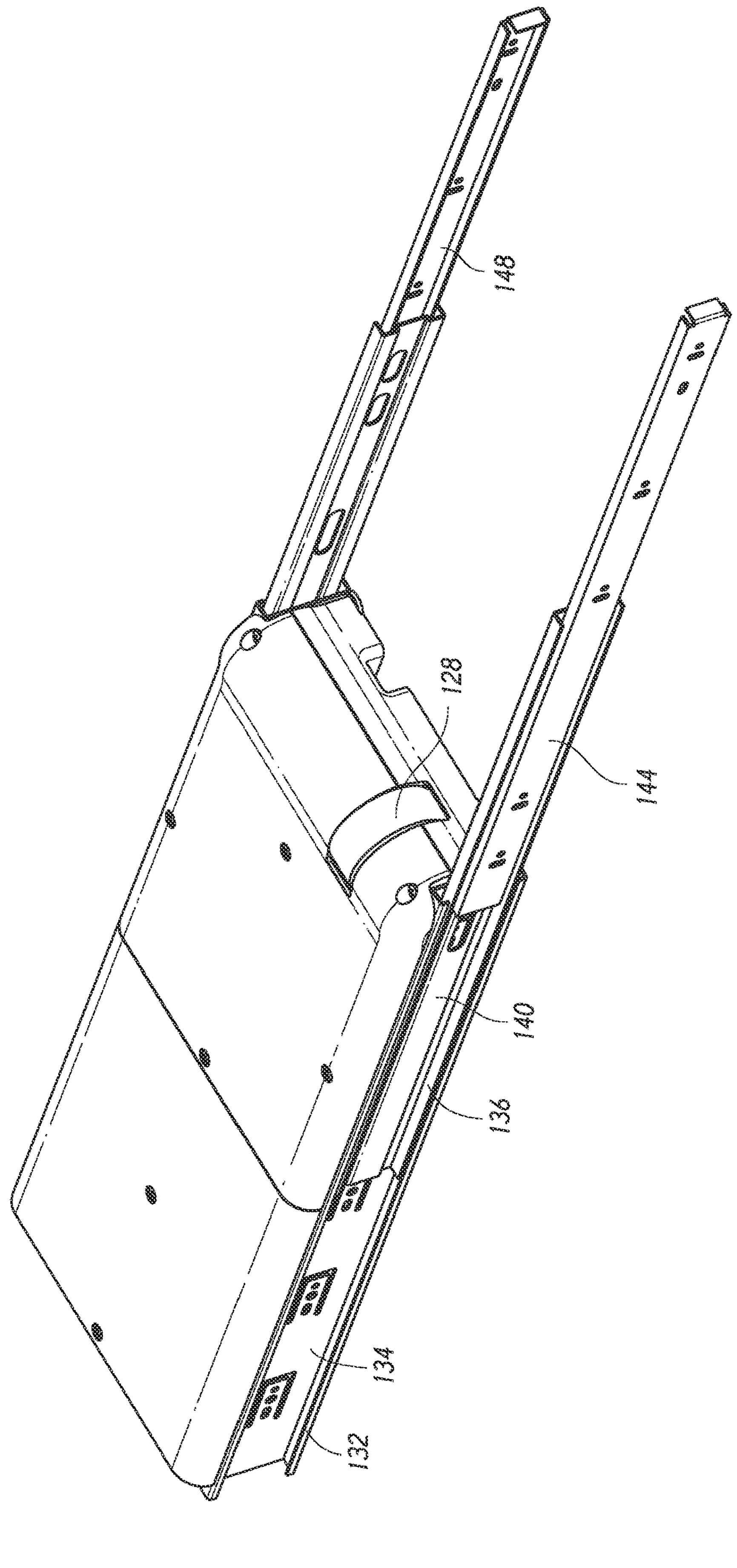
FIG. 5 is an illustration of a portion of an in-cabinet electronically movable waste receptacle of FIG. 1B depicting a lower portion of the system.

FIG. 1D shows the sensor mount 504. The sensor mount 504 can include one or more sensors 506*a*, 506*b*, 506*c*. For example, the sensor mount 504 can have one, two, three, or more sensors. The sensors 506, 506*b*, 506*c*, can be positioned on a mount 505 that is connected to the mounting plate 503. The mount 505 can have a number of surface areas corresponding to the number of sensors 506*a*, 506*b*, 506*c*. The surface areas can be angled to allow the sensors 506*a*, 506*b*, 506*c*, to face various directions. For example, in FIG. 1D a first sensor 506*a* can be positioned to face a first lateral side of the waste-receiving system 100, a second sensor 506*b* can be positioned to face upward, and a third sensors 506*c* can be positioned to face a second lateral side of the waste receiving system 100.

The side facing sensors 506*a*, 506*c* can be used to detect side obstructions or potential collisions. The upward facing sensor 506*b* can be used to detect the presence of a person and/or the presence of trash or other items to be placed in the receptacle(s) 120. If the sensors 506*a*, 506*b*, 506*c* detect side obstructions, potential collisions, and/or items to be placed in the receptacle(s) 120, the sensors 506*a*, 506*b*, 506*c* can be configured to generate an electrical signal configured to be able to stop movement of the waste-receiving system 100 to prevent collision with obstacles or the system closing prior to waste being positioned inside of the receptacle(s) 120.

Turning back to FIG. 1C, in some embodiments, a sensor 511 such as a proximity sensor can be positioned at or near the bottom of the door 103. The sensor 511 can be positioned on the internal side of the door 103. The sensor 511 can be positioned generally directed downward toward the floor, such as by attaching it in a bottom region of the waste-receiving system (e.g., on the bottom edge of the door 103, behind the door, below the receptacle(s) 120, and/or on or below the rails, generally facing the floor). The sensor to sense movement in the region of the toe-kick (e.g., the region below and recessed behind the door 103). For example, in some embodiments, the sensor 511 can be positioned 511 can be positioned on the toe-kick of the cabinet, or in any other position to detect movement, such as movement that occurs below and/or behind the door. In some embodiments, the sensor 511 is static and does not move with the door 103. Depending on the position of the sensor 511, the sensor 511 can be properly angled to detect movement in any desired area to actuate the opening and/or closing of the waste-receiving system 100. In some embodiments, the sensor 511 can be a proximity sensor, such as a sensor with an infrared emitter and detector. In some embodiments, the sensor 511 can be a button or an accelerometer that can be configured to sense touch, contact, and/or knocking. The sensor 511 can be used to actuate movement of the door 103. For example, a user can place a foot in a lower region of the waste-receiving system 100, such as near the toe-kick region, to be sensed by the sensor 511 (e.g., near the sensor 511) to actuate movement of the door 103 to open or close the waste-receiving system 100. In some embodiments, it is not required for the user to physically touch any part of the waste-receiving system in order to actuate movement of the waste-receiving system 100 between the open or closed positions.

In some embodiments, a microphone 512 can be positioned at the bottom of the door 103. The microphone 512 can be positioned on the internal side of the door 103. The microphone 512 can be positioned on the bottom edge of the door 103 facing the floor. The microphone 512 can be positioned on the toe-kick of the cabinet. The microphone 512 can be static and not move with the door 103. The microphone 512 can be attached under the toe kick of the cabinet and positioned through a drilled hole. The microphone 512 can be used to produce a signal indicative of a user command which can be transmitted to a processor which can be configured to enable voice activation of the waste receptacle system 100.

FIGS. 2, 3, 4, and 5 show part of an embodiment of the waste receptacle system 100. Specifically, the translating mechanism is shown. One purpose of the translating mechanism is to mechanically move the waste receptacles 120 out of a cabinet. In some embodiments, the translating mechanism includes sliding rails 112. The sliding rails 112 can be telescoping rails with two or more sections. The sliding rails 112 can have a portion that is fixedly attached to the base 108. The base 108 can include a drive system. The drive system can be an electric drive system. The drive system is functional to receive a command or signal. The drive system, upon receiving a signal, applies a force that tends to move or translate the waste receptacles 120 out of the cabinet. In some embodiments, the drive system may move or translate the waste receptacles along a straight path. In some embodiments, the drive system can be a drive wheel 128.

In some embodiments, the drive wheel 128 can be located offset from a central longitudinal axis of the base 108. In some embodiments, the drive wheel 128 may be centered on the base 108. The drive wheel 128 may be located on a leading edge of the base 108. This positioning may be advantageous to enable the waste receptacles 120 to be fully extended out of the cabinet. In some embodiments, the drive system can include multiple drive wheels. The size of the drive wheel 128 may be selected based on the number of drive wheels, the position of the drive wheel 128, and the size of the waste receptacles 120. At least a portion of the drive wheel can be flexible, resilient, and/or elastomeric. For example, at least a portion of the drive wheel can be formed out of rubber or an elastomer.

In some embodiment, the drive wheel 128 can be configured to impinge on an extension 122. The extension 122 can form part of the holder 118. The extension 122 can provide a tab on which the drive wheel 128 can exert a motive force to move or translate the holder 118 and associated waste receptacles 120 out of, or back into the cabinet. The extension 122 can be a projection that extends from a lower surface of the holder 118. The extension 122 can be positioned and sized to enable the waste receptacles 120 to move or translate a desired distance out of the associated cabinet.

The sliding rails 112 can be configured to enable the waste receptacles 120 to be moved or translated out of the casing 104, from a closed or retracted position of the waste-receiving system 100 to an open or extended position of the waste-receiving system 100. The driving force can be provided by the drive wheel 128 or another drive system. The sliding rails 112 may have various parts. In some embodiments the sliding rails 112 include two sliding rails, one attached on each side of the base 108. Each on of the sliding rails can have three components. In some embodiments, a first track 132 is attached directly to the base 104. The first track 132 can be fixed in position relative to the base. The first track can have a trough 134 on a first side and a flat section on the second side. The trough 134 may face away from the base 104. In some embodiments, a second track 136 can slide inside the trough 134 on the first track 132. The second track 136 may have a trough 140. The trough 140 may be oriented to face away from the base 104. A third track 144 can be arranged to slide inside the trough 140. The third track 144 can have a trough 148. The trough 148 may be arranged to face towards the base 104.

The movable portion 116 can be attached to a surface of the third track 144. In some embodiments, the movable portion 116 has a smooth outer surface. The smooth outer surface can be advantageous for ease of cleaning. The smooth outer surface of the movable portion 116 can be advantageous since it may be aesthetically pleasing. The smooth outer surface of the movable portion 116 can be advantageous since it may act as a guard to prevent fingers, toes, or other body parts from entering the troughs on the sliding rails 112. In some embodiments the moveable portion 116 is attached to the third track 144 on a surface facing away from the base 108. The moveable portion 116 may be attached to the third track by any fastener. The fastener can include screws, bolts, adhesives, or other fastener.

The top surface of the moveable portion 116 can be configured to be attached to a holder 118. The attachment can be accomplished with one or more screws, bolts, adhesives, or other fastener. The top of the holder can have a lip 152. The lip can generally surround an inset area 156. The inset area 156 can be configured to snugly receive one or more waste receptacles 120. The inset area 156 can be advantageously sized to prevent the waste receptacles 120 from tipping when the moveable portion 116 is moved by the sliding rails 112 or another system. In some embodiments, the waste receptacles 120 may have a connecting top 160. The connecting top 160 can be a single piece of material configured to fit snugly onto the tops of the one or more waste receptacles 120. The connecting top 160 can be removable. Advantageously, the connecting top 160 can make the waste receptacles 120 more stable when the moveable portion 116 is in motion. Additionally, since the connecting top 160 can be removable it can make emptying the waste receptacles 120 easier.

Figure 6:
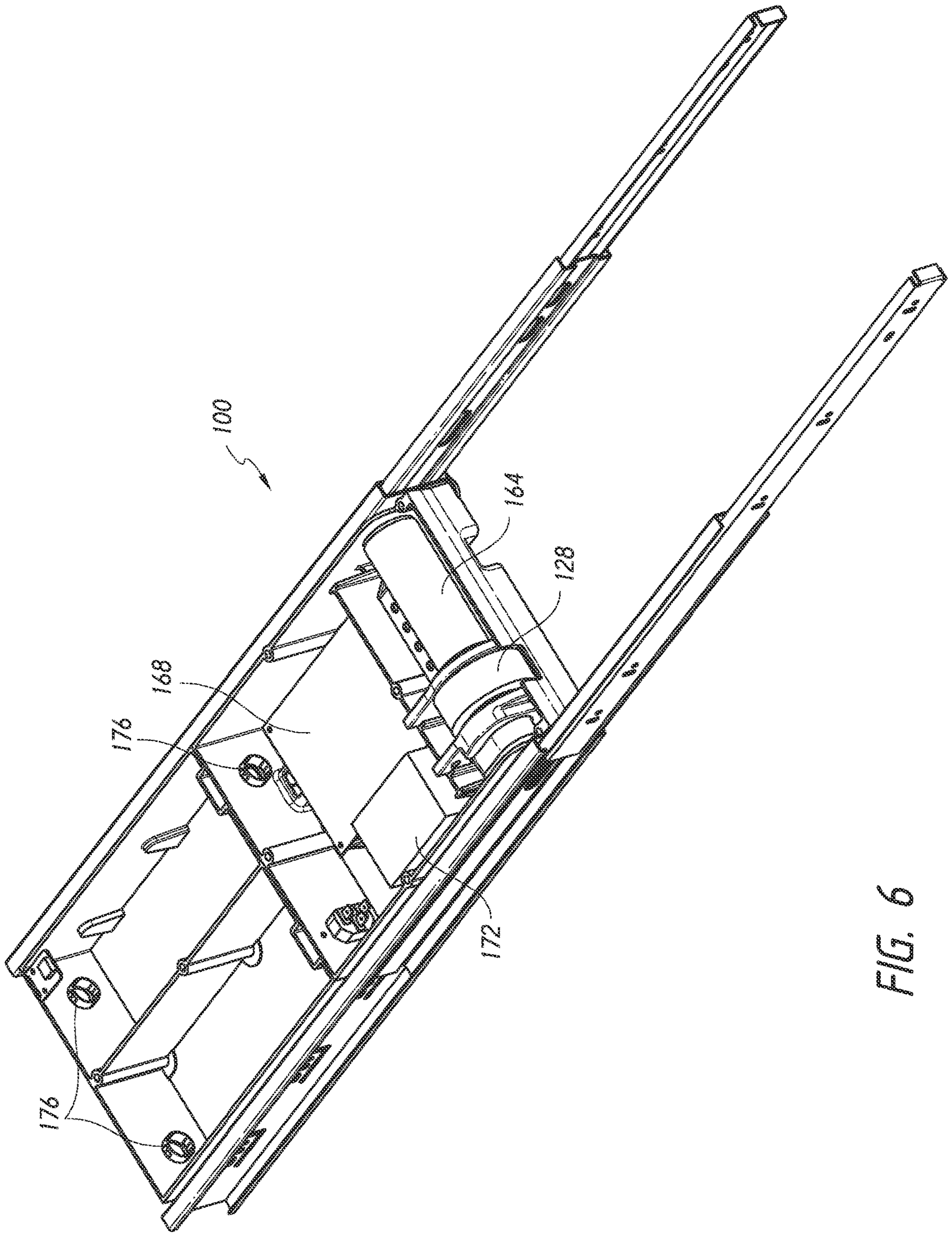
FIG. 6 is an illustration of a portion of an in-cabinet electronically movable waste receptacle of FIG. 1B depicting a lower portion of the system with a cover removed.

Turning to FIG. 6. FIG. 6 depicts an embodiment of the waste-receiving system 100. The drive wheel 128 is shown connected to a motor 164. The motor 164 can be an electric motor. In some embodiments, the motor 164 can be controlled by a controller 168. In some embodiments, the motor can receive power from a power source 172. As illustrated, in some embodiments the motor 164 is positioned on a lower side or region of the waste-receiving system 100, such that in the closed or retracted position, the motor 164 is generally enclosed within and/or positioned below the top surface of the base 108 and/or is positioned directly below one or more of the receptacles 120. The motor 164 can be configured to provide power or force to open the waste-receiving system 100. The motor 164 can be configured to provide power or force to close the waste-receiving system 100. Outside human force is not necessary to open and/or close the waste-receiving system 100.

Figure 6A:
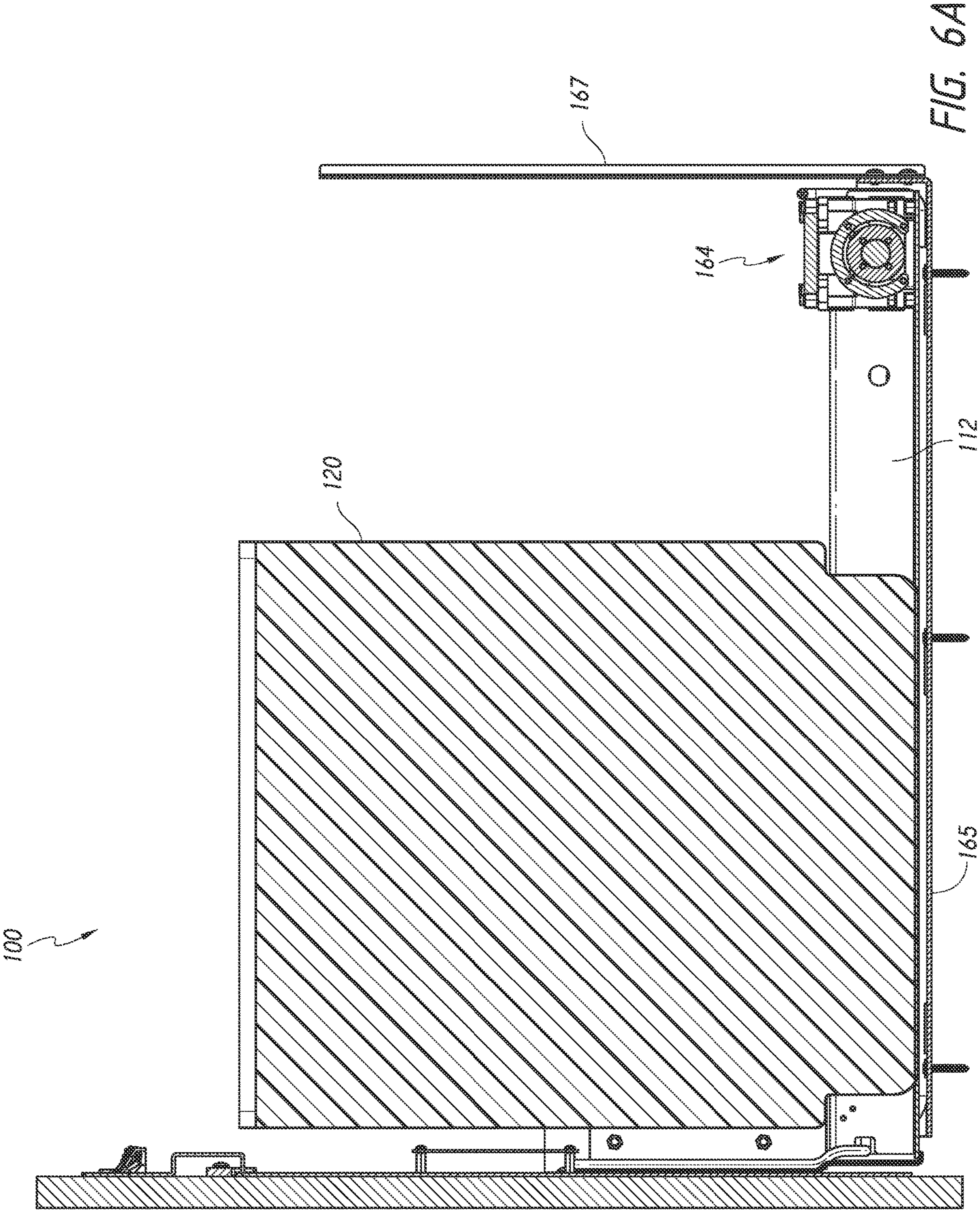
FIG. 6A is a section view of an in-cabinet electronically movable waste receptacle depicting a motor positioned in the rear of the system.
Figure 8:
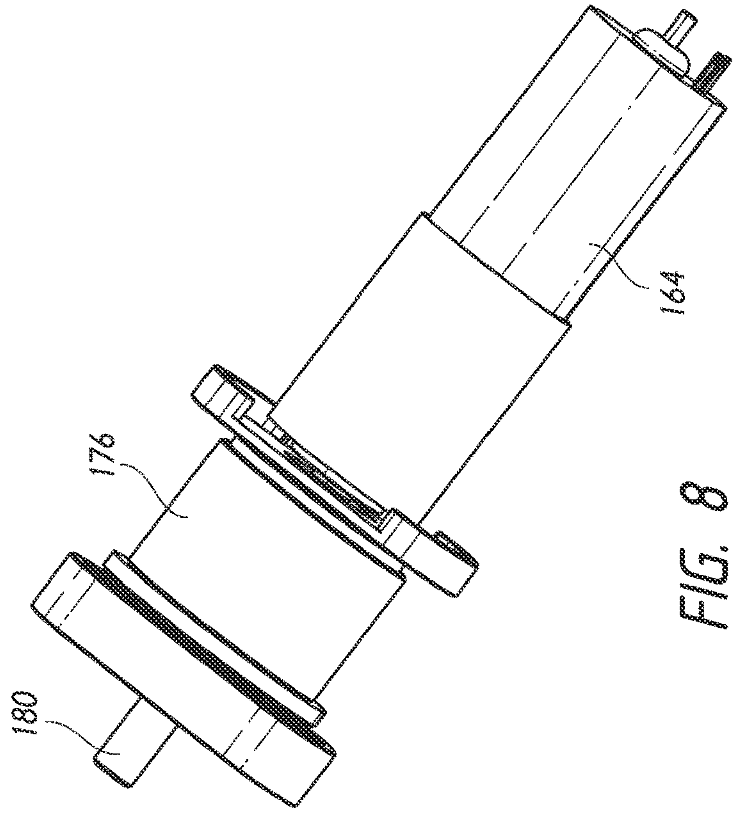
FIG. 8 is an illustration of a motor with a clutch attached.

FIG. 6A is a section view of a waste-receiving system 100. In some embodiments the motor 164 can be positioned in the back of the waste-receiving system 100. For example, the motor 164 can be positioned between the waste receptacle(s) 120 and a rear wall 167, or the motor 164 can be positioned in contact with the rear wall 167, or the motor 164 can be positioned between the sliding rails 112. By providing the motor 164 in one or more of these positions, the waste receptacle(s) 120 can have a large volume. For example, the bottom of the one or more waste receptacle(s) 120 can be positioned below the top of one or more of the rails 112, and/or the waste receptacle(s) 120 can be positioned to sit directly on a bottom surface 165 (e.g., a surface that is configured to be adjacent to, proximate to, and/or essentially coplanar with the bottom of the cabinet in which the waste-receiving system is mounted), allowing for an increase in waste receptacle(s) 120 volume between the sliding rails 112. The volume of the waste receptacle(s) 120 can increase by about 10% to about 15%. The motor 164 being positioned in the rear or back of the waste-receiving system 100 can allow for the motor 164 to be hidden from view of the user.

The controller 168 can receive signals from one or more of a variety of different types of sensors. In some embodiments, the sensors can include one or more light sensors (e.g., one or more infrared sensors), heat sensors, stress/strain sensors, touch sensors, sound sensors (e.g., one or more microphones), and/or any other type of sensors. In some embodiments, the controller 168 can receive signals from the motor 164. In some embodiments, the controller 168 can receive/send signals from/to the power supply 172. The base 108 can include one or more fenestrations 176. The fenestrations 176 can be useful to route power to the power supply 172.

Figure 7:
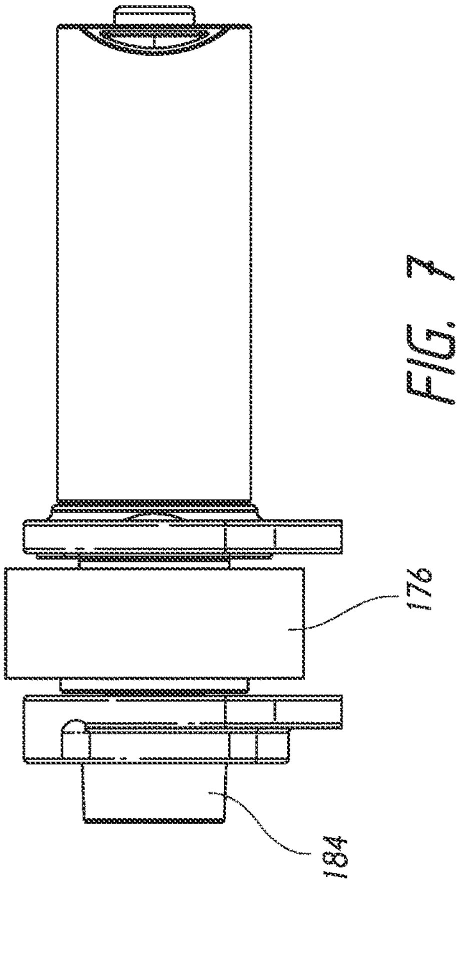
FIG. 7 is an illustration of a motor with a clutch and encoder attached.
Figure 10:
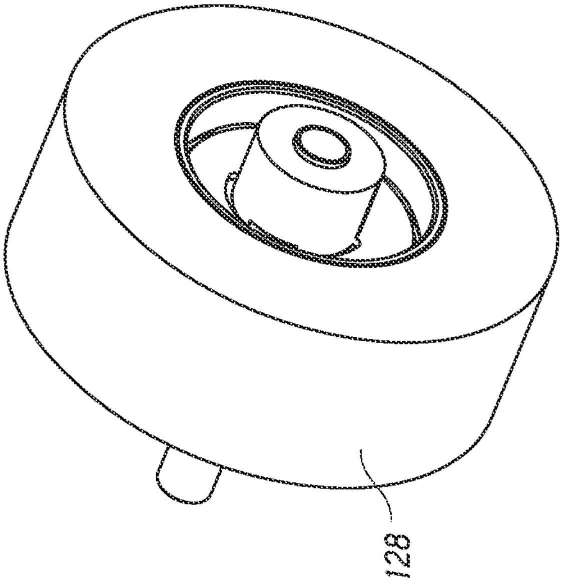
FIG. 10 is an illustration of a clutch and drive wheel.
Figure 9:
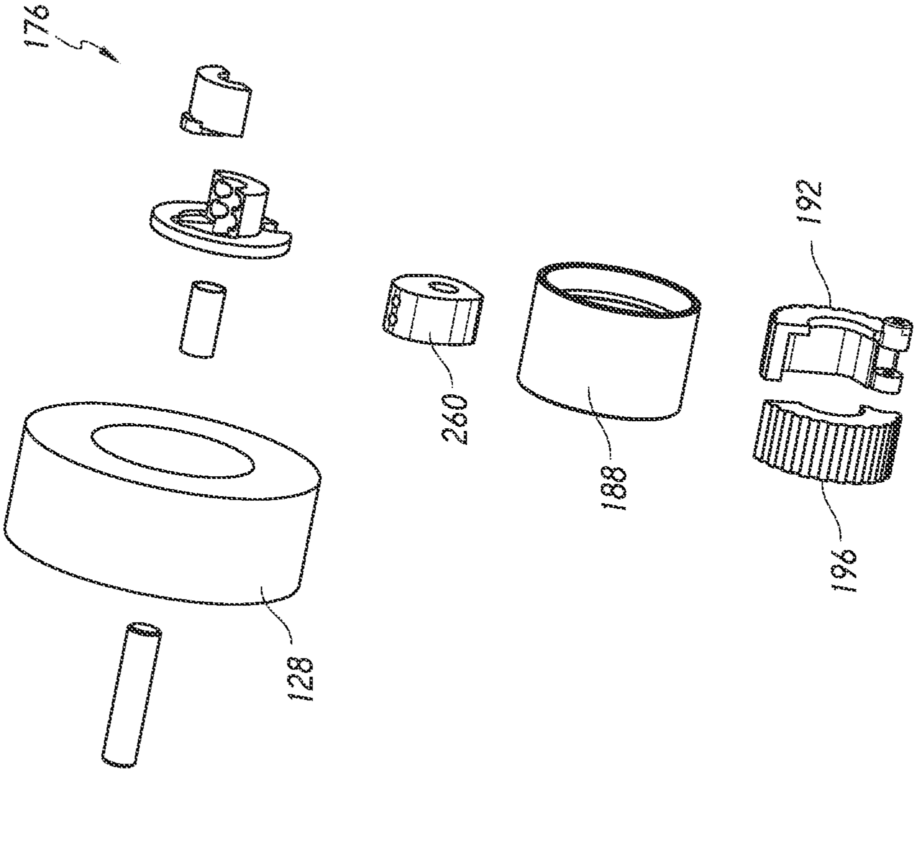
FIG. 9 is an illustration of an exploded view of a clutch and drive wheel.
Figure 13:
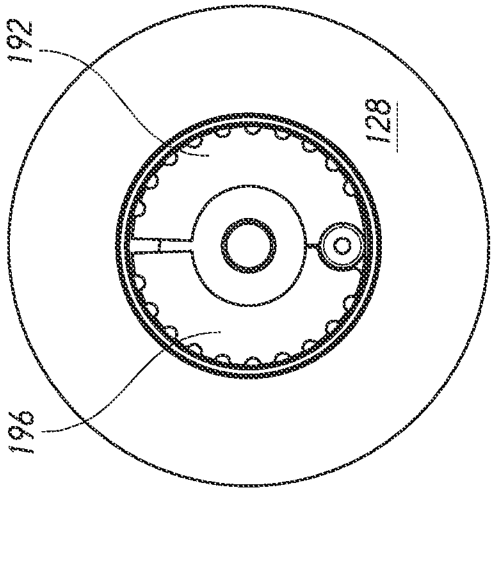
FIG. 13 is an illustration of a clutch and drive wheel from a second side.
Figure 12:
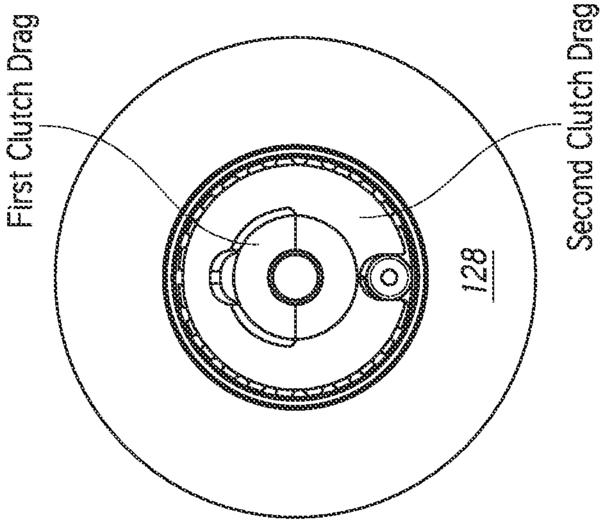
FIG. 12 is an illustration of a clutch and drive wheel from a first side with clutch drags.
Figure 11:
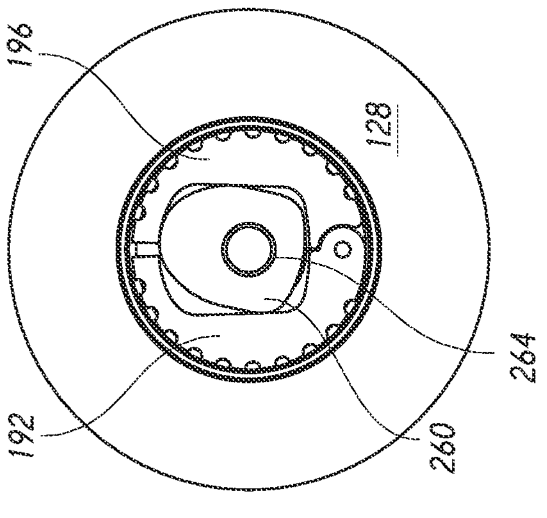
FIG. 11 is an illustration of a clutch and drive wheel from a first side with clutch drags removed.
Figure 15:
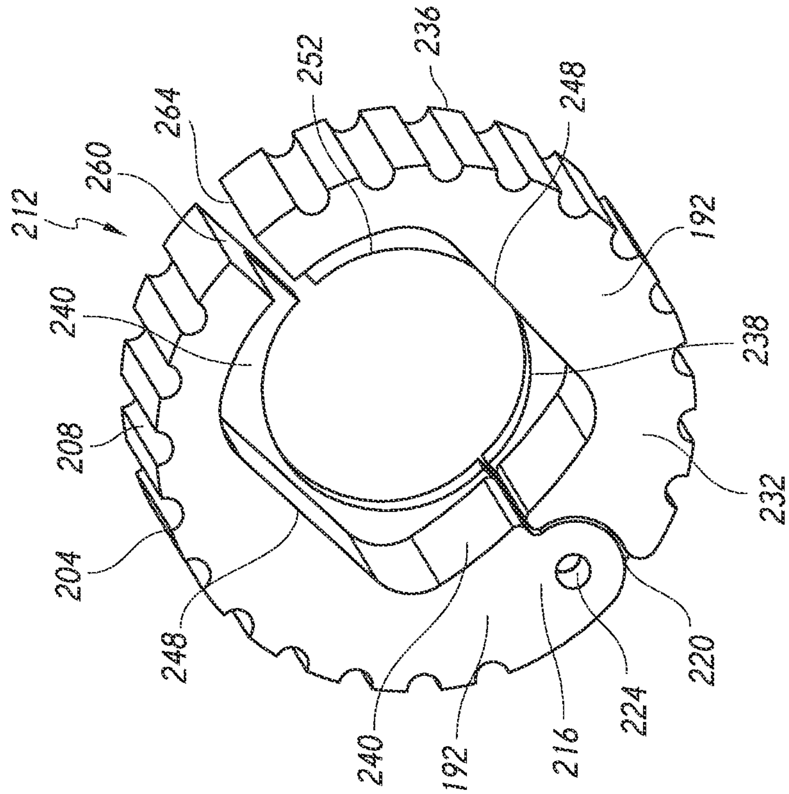
FIG. 15 is an illustration of a clutch dog assembly.
Figure 14:
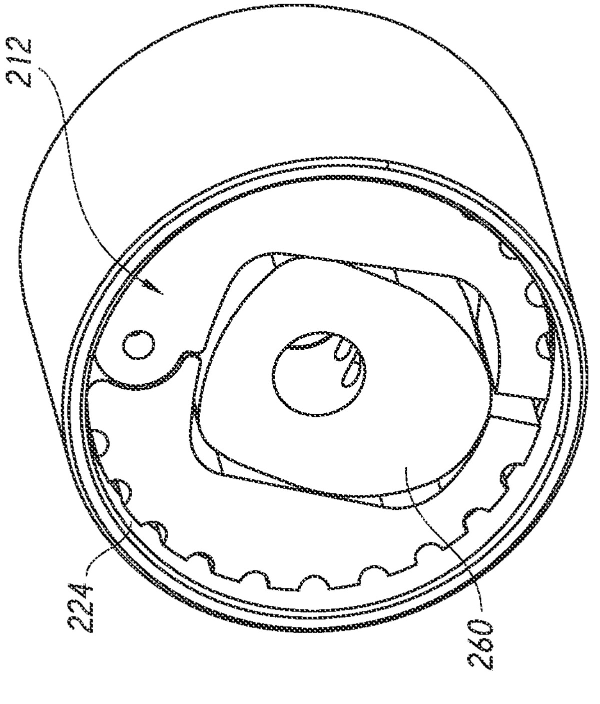
FIG. 14 is an illustration of a clutch.
Figure 17:
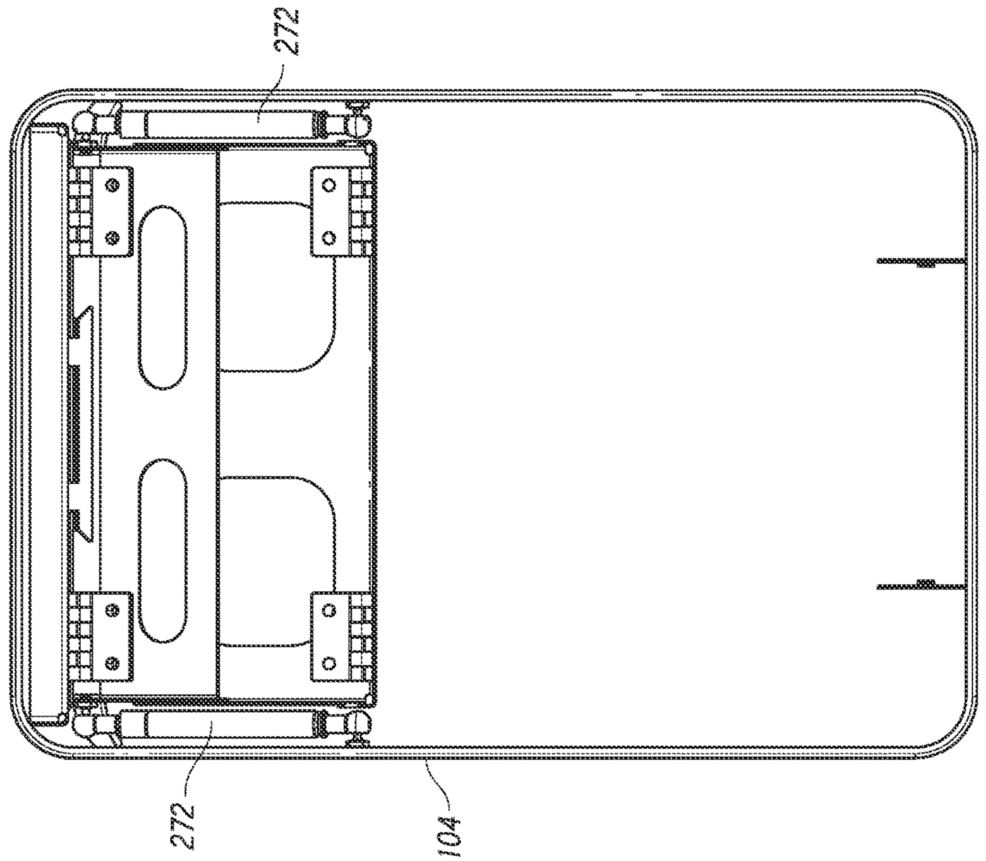
FIG. 17 is an illustration of a rear view of a lid actuator system of FIG. 16.
Figure 16:
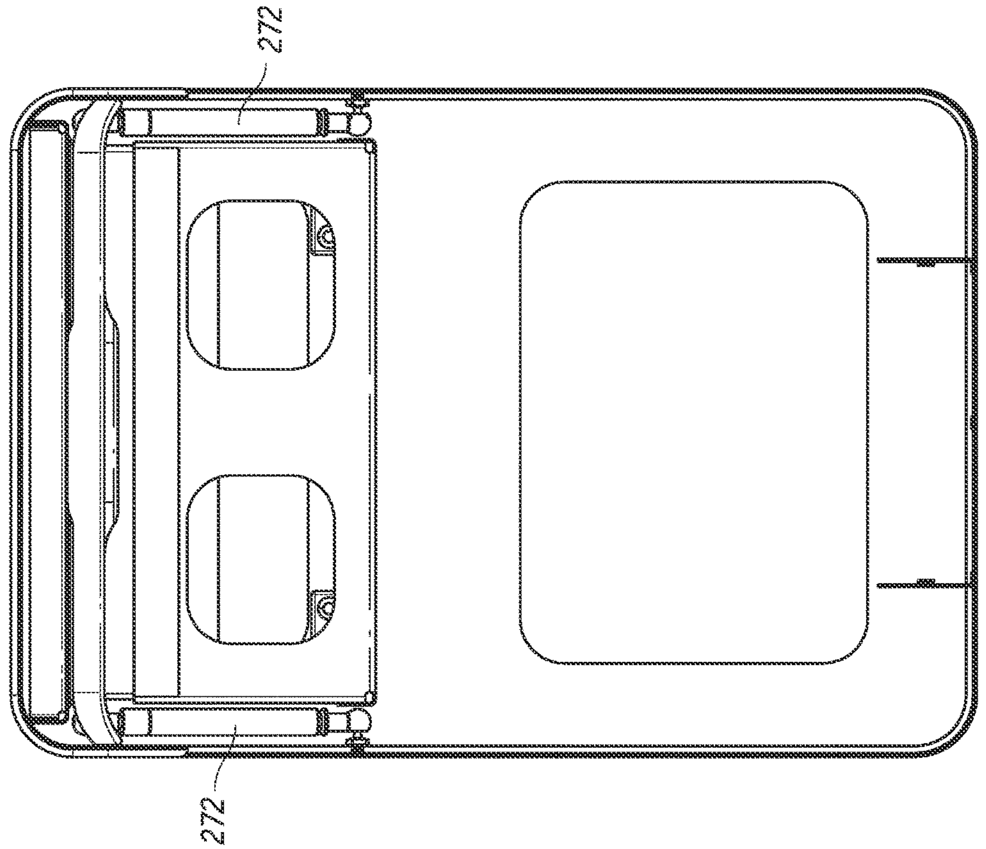
FIG. 16 is an illustration of a front view of a lid actuator system of the electronically movable waste receptacle depicted in of FIG. 1B.
Figure 18:
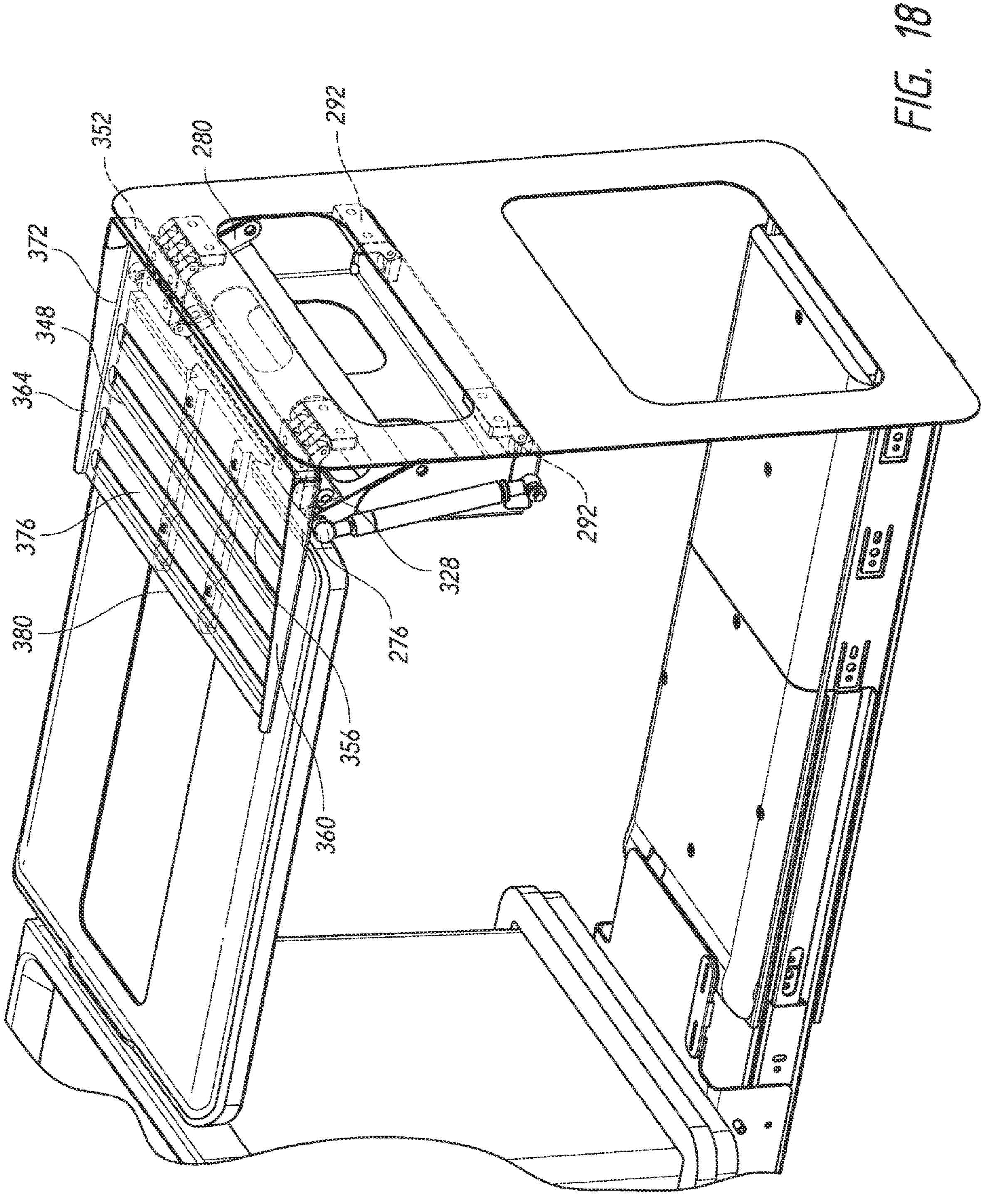
FIG. 18 is a perspective view of the in-cabinet electronically movable waste receptacle of FIG. 1B with parts removed depicting the lid actuator system of FIG. 16.
Figure 19:
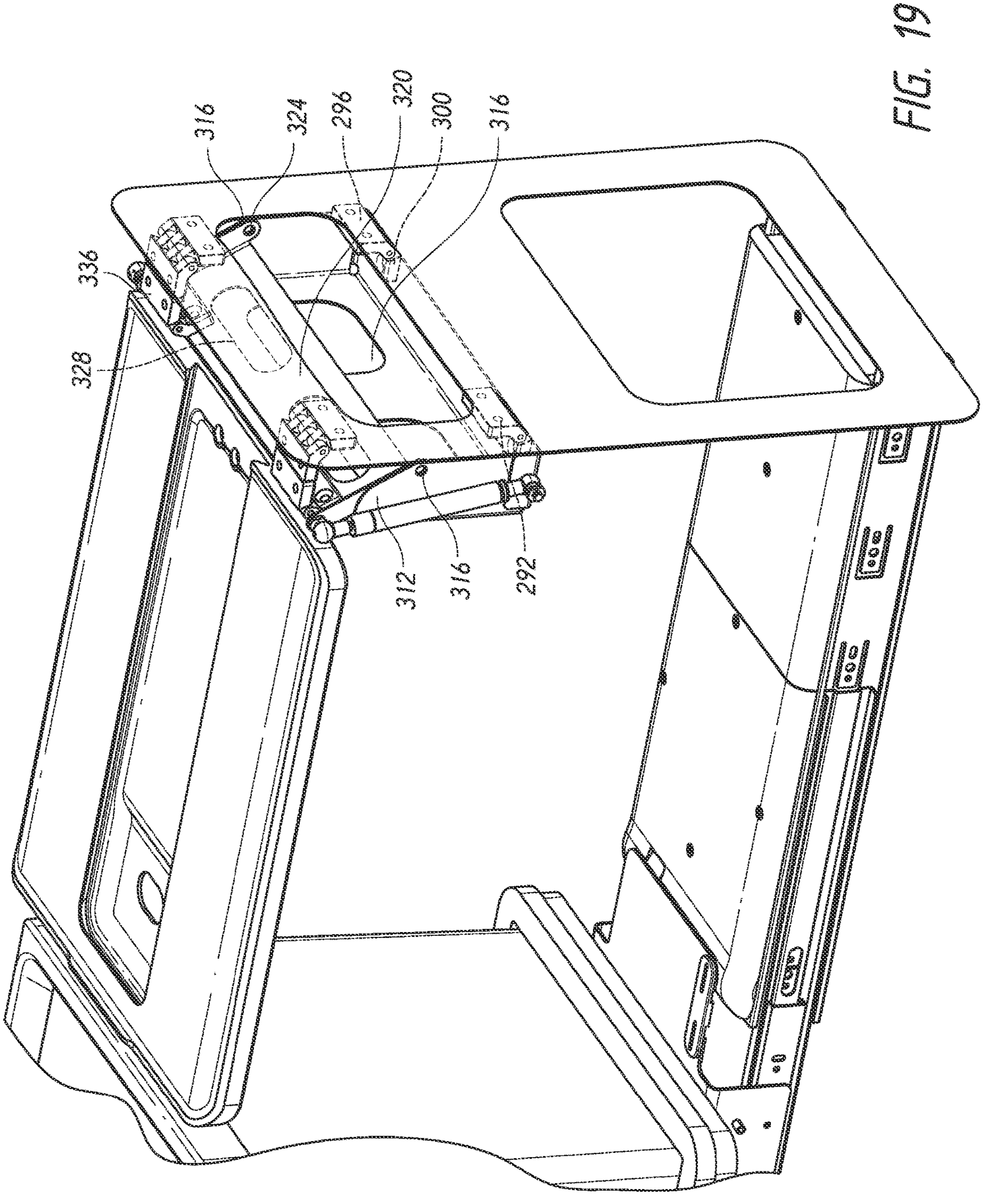
FIG. 19 is a perspective view of the in-cabinet electronically movable waste receptacle of FIG. 1B with parts removed depicting the lid actuator system of FIG. 1B.
Figure 20:
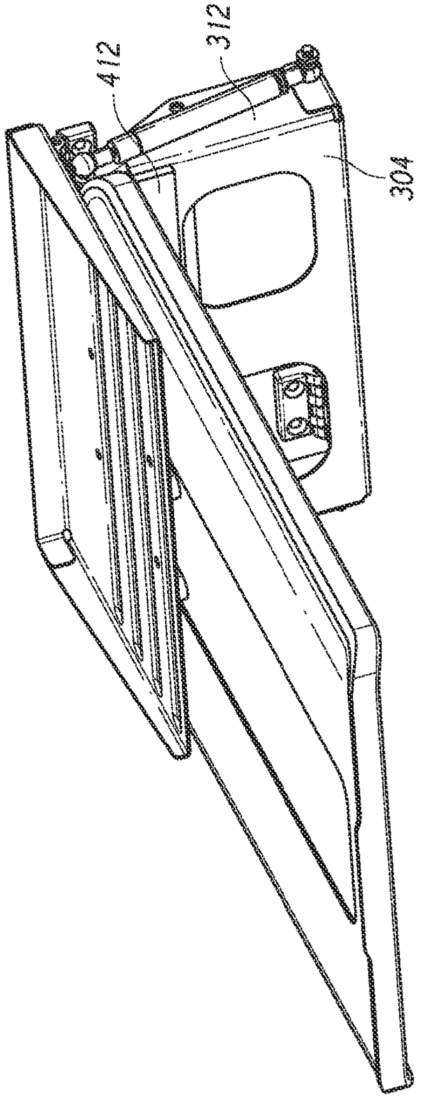
FIG. 20 is an illustration of a perspective view of the lid actuator system of FIG. 16 isolated from an associated in-cabinet electronically movable waste receptacle.
Figure 21:
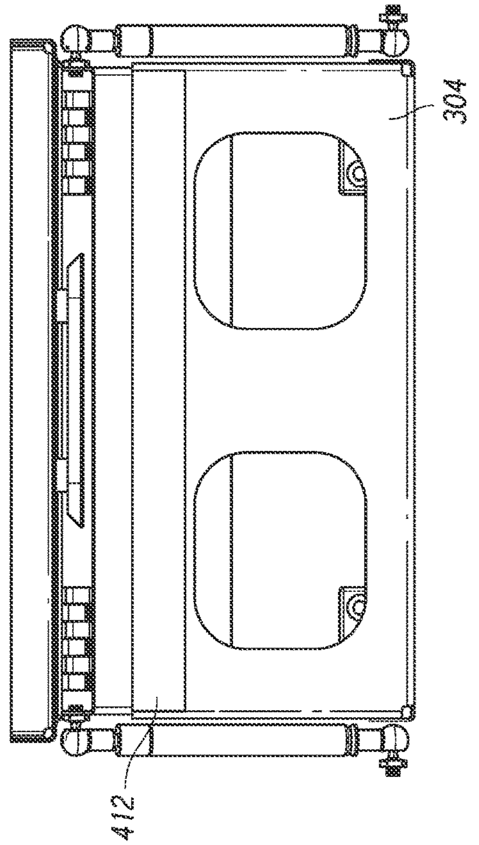
FIG. 21 is an illustration of a front view of the lid actuator system as shown in FIG. 20 isolated from an associated in-cabinet electronically movable waste receptacle.
Figure 22:
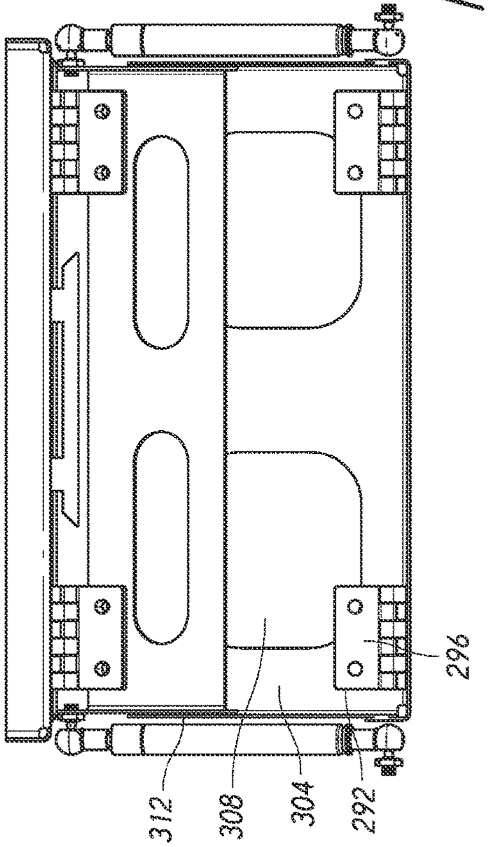
FIG. 22 is an illustration of a rear view of the lid actuator system as shown in FIG. 20 isolated from an associated in-cabinet electronically movable waste receptacle.
Figure 23:
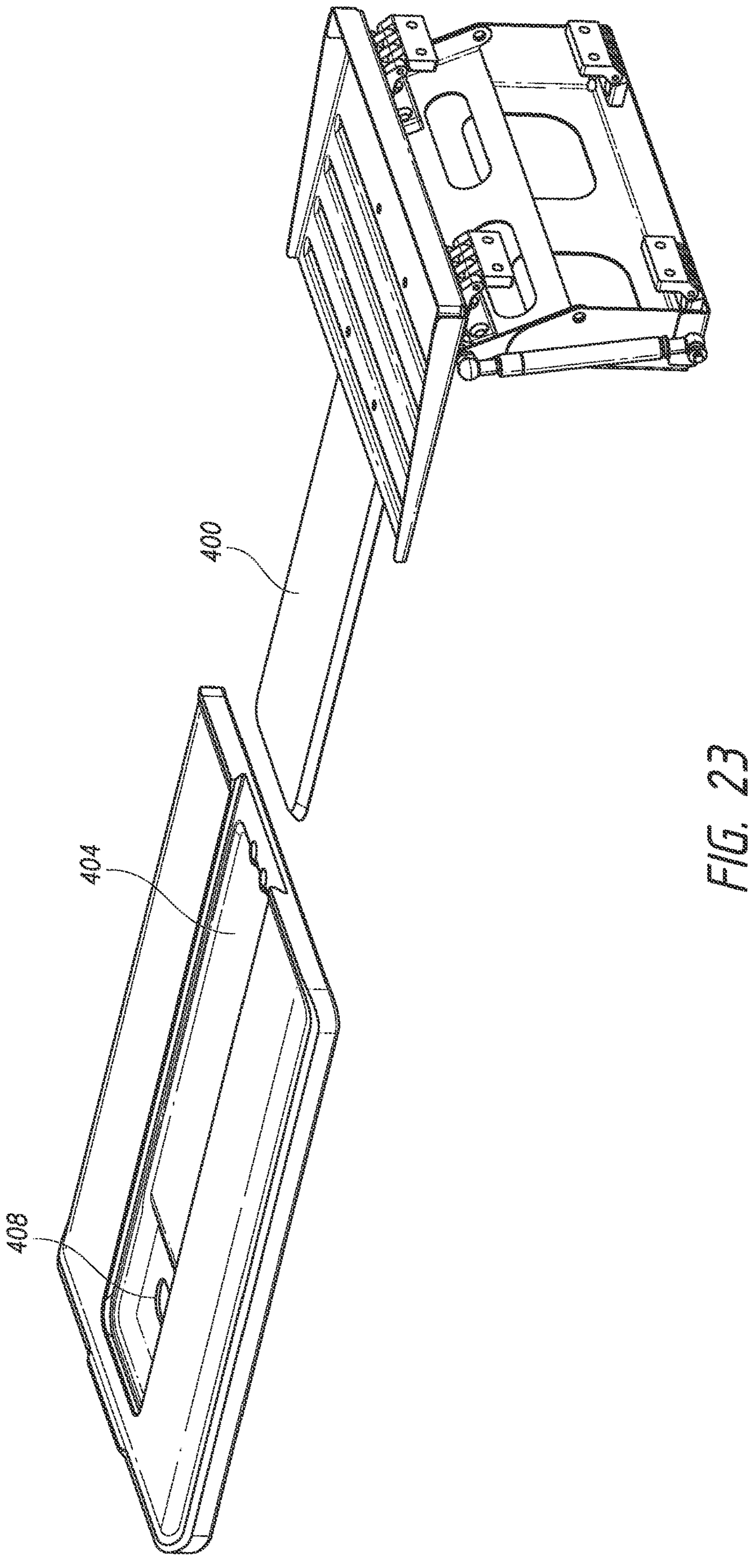
FIG. 23 is an illustration of a perspective view of the lid actuator system as shown in FIG. 20 including a depiction of a lid and a lid insert.

FIG. 7 depicts the motor 164. The motor 164 drives the drive wheel 128. In some embodiments, a clutch, such as a bi-directional clutch 176, is positioned inside the drive wheel 128. In some embodiments, no clutch can be used, and direct drive can be used. The bi-directional clutch 176 can be connected to connected to the motor 164. In some embodiments, when the motor is engaged, the bi-directional clutch 176 can deliver a driving force to the drive wheel 128. In some embodiments, the bi-directional clutch 176 can drive an encoder shaft 180. The encoder shaft 180 can be attached to an encoder 184. The encoder 184 can be in communication with the controller 168. FIG. 9 depicts an exploded view including an embodiment of the bi-directional clutch 176 and the drive wheel 128. FIG. 10 depicts the same parts as FIG. 9, but in an assembled view. In some embodiments, the bi-directional clutch can include a clutch body 188. In some embodiments, the clutch body 188 can be snugly or tightly inserted into the drive wheel 128. The clutch body 188 and drive wheel 128 can be fixed relative to each other. Rotation of the clutch body 188 rotates the drive wheel 128 an equivalent amount. In some embodiments there may be an amount of slippage between the clutch body 188 and the drive wheel 128 when the clutch body is driven. Arranged inside the clutch body 188 are a first clutch dog 192 and a second clutch dog 196.

The first clutch dog 192 can be assembled to the second clutch dog 196. In the assembled state, the first clutch dog 192 and the second clutch dog 196 are free to rotate with respect to each other.

FIGS. 11, 12, 13, 14, and 15 provide various views of the bi-directional clutch 176. The first clutch dog 192, can have a semicircular shape. In some embodiments, the outer surface 200 of the first clutch dog 192 can have one or more teeth 204. In some embodiments, the teeth 204 cross-sections are flat-topped. In some embodiments, the teeth 204 can have a variety of cross-section shapes. In some embodiments, the depressions 208 between the teeth 204 can have semi-circular cross-sections. Other cross-sections for the depressions 208 between the teeth 204 are also possible.

In some embodiments, the teeth 204 are suitable for engaging with the clutch body 188. In the engaged state, the teeth 204 may be in contact with the clutch body 188. When engaged, rotation of the clutch dog assembly 212, causes an equivalent rotation of the clutch body 188. In some embodiments, the rotational load on the clutch body 188 is exerted by the teeth 204.

The second clutch dog 196 is similar to the first clutch dog 192. The combination of the first clutch dog 192 and the second clutch dog 196 is at least part of the clutch dog assembly 212. In some embodiments the first clutch dog 192 can have a receiving member 216. In some embodiments the second clutch dog 196 can have an insertion member 220. The insertion member 220 can be sized and configured to be inserted into the receiving member 216. The receiving member 216 can have a through hole 224. The insertion member 220 can have a through hole 228. The through hole 224 and the through hole 228 can be aligned when the first clutch dog 192 and the second clutch dog 196 are aligned. In some embodiments, a pin can be used to secure the first clutch dog 192 to the second clutch dog 196. The pin can be sized and configured to be inserted through the hole 224 and the hole 228. In some embodiments, each of the first clutch dog 192 and the second clutch dog 196 have a generally semicircular shape. The semi-circular shape can have an opening such that it does not form an entirely closed loop, such as a general "C" shape. In some embodiments, the clutch dog assembly 212 can have a generally circular shape. The generally circular shape can be partially defined by an annular shape.

In some embodiments, the clutch dog assembly 212 has a first side 232 and a second side 236. The first side 232 and the second side 236 can be opposite each other. The outer most surfaces of the first side 232 and the second side 236 can lie on parallel planes. The first side 232 can have a depression 238. The depression 238 can be a cutout. The depression 238 can extend partway or entirely through the clutch dog assembly 212. The depression 238 can have a general rectangular shape with one or a plurality of rounded or contoured corners as illustrated. The depression 238 can have a mostly flat first end 240. The depression 238 can have a rounded second end 244. The depression 238 can include generally straight sides 248 extending from the first end 240 to the second end 244. The corners of the depression 238 can be rounded or contoured.

In some embodiments, the second side 236 can have an opening 252. The opening 252 can be generally circular. The opening 252 can connect with the depression 238. The combination of the depression 238 and the opening 252 can create a passage fully through the clutch dog assembly 212. In some embodiments, the size of the opening 252 varies depending on the configuration of the clutch dog assembly 212. In some embodiments, the first clutch dog 192 and the second clutch dog 196 can rotate relative to each other. The shape of the first clutch dog 192 and the second clutch dog 196 can define the opening 252 and the depression 238.

In some embodiments, the clutch dog assembly 212 is sized and configured to fit inside the clutch body 188. An open configuration of the clutch dog assembly can be defined by the clutch body 188. In some embodiments, the fully open configuration of the clutch dog assembly 212 causes at least some of the teeth 204 to engage with an inner surface 256 of the clutch body 188. In some embodiments, the fully closed configuration of the clutch dog assembly 212 causes the first clutch dog 192 and the second clutch dog 196 to contact at their respective distal ends 260 and 264.

In some embodiments, when the clutch dog assembly 212 is in the open configuration, with its teeth 204 engaged to the inner surface 256, the bi-directional clutch 176 is able to transmit power. The open configuration can be an engaged configuration. In some embodiments, when the clutch dog assembly 212 is in the closed configuration, the teeth 204 may not engage with the inner surface 256, and the bi-directional clutch 176 may be unable to transmit power. The closed configuration can be an unengaged or freewheel configuration. In some embodiments, when the clutch dog assembly 212 is in the closed configuration, the clutch body 188 is able to freewheel. In some embodiments the clutch body 188 is mostly fixed relative to the drive wheel 128. In some embodiments, when the clutch 176 is engaged, the drive wheel 128 is driven by the motor 164. In some embodiments, when the clutch 176 is disengaged the driven wheel 128 can be turned without driving the motor 164.

In some embodiments, the clutch dog assembly 212 is engaged by a clutch drive hub 260. In some embodiments, the clutch drive hub 260 can have a first end or side that is substantially wider than a second end or side, for example the first end or side of the clutch drive hub 260 can be generally rounded or pointed and/or the second end or side of the clutch drive hub 260 can be generally flat and/or straight. The clutch drive hub 260 can be a cam that is non-symmetrical with a first end or side that is wider than a second end or side. The clutch drive hub 260 can have a variety of different shapes. In some embodiments, the clutch drive hub 260 is mechanically positioned between the clutch dog assembly 212 and the motor 164. In some embodiments, when the bi-directional clutch 176 is disengaged, the drive wheel 128 can freewheel with respect to the clutch drive hub 260. The clutch drive hub 260 can be driven by the motor 164. The shaft of the motor 164 can be inserted into a hole 264 of the clutch drive hub 260. In some embodiments, the hole is located along an axis of symmetry of the clutch drive hub 260. In some embodiments, the hole is located off-center.

The clutch drive hub 260 can be used to engage the clutch dog assembly 212, either directly or indirectly. When the clutch dog assembly 212 is engaged it enables torque transfer to the drive wheel 128 from the motor 164. The clutch drive hub 260 engages the clutch dog assembly 212 by being rotated within the clutch dog depression 238. In some embodiments, Rotating the clutch drive hub brings an engagement face 268 into contact with one of the first clutch dog or the second clutch dog. The force exerted by the clutch drive hub 260 opens the clutch dog assembly 212 into an engaged configuration. The clutch drive hub 260 can drive the clutch dog assembly 212 into an open, engaged configuration by rotating in either direction. In some embodiments, the direction of rotation of the drive hub 260 controls the direction of rotation of the drive wheel 128.

The bi-directional clutch 176 can allow the motor 164 to drive the one or more trashcans in the waste-receiving system 100 to an open or accessible position and/or to allow the motor 164 to drive the one or more trashcans in the waste-receiving system 100 to a closed or inaccessible position after use. When the motor 164 engages the clutch 176 with rotation in a first direction, the trashcan(s) can move to an open position. When the motor 164 engages the clutch 176 with rotation in a second direction, the trashcan (s) can move to a closed position.

When the motor 164 drives the clutch drive hub 260, the one or more waste receptacles are indirectly engaged, and moved, by the motor 164. When the motor 164 is not driving the clutch drive hub 260, the drive wheel 128 can freewheel with respect to both the motor 164 and the bi-directional clutch 176. The freewheel motion of the drive wheel 128 allows the one or more waste receptacles 120 to move while the motor 164 remains motionless. This type of motion is advantageous for enabling the waste receptacles 120 to be pushed closed or pulled open by a user while the electrical motor 164 is not actuated or powered and without requiring the user to push or pull with a substantially higher force as would otherwise be required to overcome the inertia of the motor 164 and related gearing and/or other drive mechanisms or components.

The automatic lid opening assembly is depicted in FIGS. 16, 17, 18, 19, 20, 21, 22, and 23. In some embodiments, the waste receptacle lid 124 can be opened by the one or more mechanical energy storage devices or springs, such as one or more air springs 272. The air springs 272 can be connected at a first end 276 to the waste lid actuator bar 280. The air springs 272 can be connected at a second end 288 to the casing 104.

The springs 272 can be capable of transitioning from a first configuration to a second configuration. In the first configuration, the waste receptacle lid 124 is positioned on top of the one or more waste receptacles 120. In the second configuration, the waste receptacle lid 124 is positioned away from the waste receptacles 120. When the waste receptacle lid 124 moves away from the waste receptacles 120 it can open a space through which trash can be thrown. In some embodiments the air springs 272 are in a compressed state when the waste receptacle lid 124 is positioned on top of the one or more waste receptacles.

In some embodiments, the casing 104 is connected to a first set of one or more hinges 292. In some embodiments, the first set of hinges 292 can include two hinges. In some embodiments, the first set of hinges 292 can include one or more than two first hinges. In some embodiments, the first hinges 292 can have a first portion 296 and a second portion 300. The first portion 296 can be connected to the casing 104. The second portion 300 can be connected to the main plate 304. In some embodiments, the main plate can have cutouts 308. The plate 304 can include wings 312. The wings 312 can have holes 316. The hole 316 can accommodate a fastener.

In some embodiments, a second plate 320 has a hole 324. The holes 316 and 324 can be aligned. The plate 320 and the plate 304 can be coupled to each other. The plate 320 and the plate 304 can be coupled to each other using a fastener. In some embodiments, the plate 320 and plate 304 can move relative to each other while the holes 316 and 324 remain aligned. The second plate 320 can include cutouts 328. In some embodiments, the width of the main plate 304 and the width of the second plate 320 can be approximately equal. In some embodiments, the width of the second plate 320 can be smaller than the width of the main plate 304. The second plate 320 can nest inside the main plate 304.

In some embodiments, the second plate 320 can have a second end 332. The second end 332 can be located opposite the second plate holes 324. The second end 332 can be coupled with a second set of one or more hinges 336. In some embodiments, the second set of hinges 336 can include two hinges. In some embodiments, the second set of hinges 336 can include one or more than two second hinges 336. The second hinges 336 can have a first portion 340 connected to the second plate 320 second end, and a second potion 344 connected to a third plate 348. In some embodiments, the third plate 348 can be attached at a first end 352 to the second portion 344. In some embodiments, the third plate 348 can have a ridged upper surface with one or more ridges 356. In some embodiments, the ridges 356 extend from a first side 360 of the third plate 348 to a second side 364 of the third plate 348. The third plate 348 can have holes 368. The holes can be configured to receive fasteners.

In some embodiments, the third plate 348 can include a rim 372. The rim 372 can be extend from a base plate 376. The ridges 356 can be positioned on, or molded from, the base plate 376. The rim 372 can extend perpendicularly from the edge of the third plate base 376. The rim on the first side 360 and second side 364 can be angled. In some embodiments, the third side 380 has no rim. In some embodiments, the fourth face 384 can have a rim 372. The height of the rim extending from the fourth face 384 can be equal to the maximum height of the rim extending from the first side 360 and the second side 364. In some embodiments, the rim 372 has a minimum height on the first side 360 and second side 364 where the first side 360 and second side 364 meet the third side 380.

In some embodiments, the third plate 348 can also be connected to a third set of one or more hinges 388. In some embodiments, the third set of hinges 388 can include two hinges. In some embodiments, the second set of hinges 388 one or more than two second hinges 388. In some embodiments, the second hinges 388 can have a first portion 392 connected to the third plate 348. In some embodiments, the second hinges 388 can have a second portion 396 connected to the casing 104.

In some embodiments, the waste receptacle lid 124 can have an associated insert 400. The insert 400 can be attached to the third plate 348. Fasteners can be inserted through the holes 368 into receivers on the insert 400. In some embodiments, the insert 400 has features that are configured to accommodate the ridges 356. The was receptacle lid can have a cross-sectional shape that matches a corresponding receiver 404, the receiver 404 being part of the waste receptacle lid 124. In some embodiments, the cross-sectional shape of the insert 400 is a trapezoid. In some embodiments, other cross-sectional shapes can be utilized.

The shape of the insert 400 can be advantageous for removing the lid of the waste receptacles 120 when the waste receiving system 100 is opened. In some embodiments, when the waste receiving system rolls forward the insert 400 can slide with the receiver 404. The lid 124 moves or translates while the insert 400 moves relative to the lid. In some embodiments the relative motion between the insert 400 and the lid 124 can result in the waste receptacle lid aperture 408 being opened. This is advantageous in cases where a user wants to open the waste receptacle sufficiently to put in a small object, such as a cup, without fully opening the waste receptacle. In some embodiments, when a longitudinal force is applied on either the insert 400 or the lid 124, the two move relative to each other. In some embodiments, when a transverse force is applied to either the insert 400 or the lid 124, the two can move together without relative motion. When a force is applied with both lateral and longitudinal components, the insert 400, can the lid 124 may move with a component of the movement being relative motion between the insert 400 and the lid 124.

In some embodiments, the main plate 304 is coupled to a push bar 412. The push bar 412 can be mechanically fastened to the main plate 304. The push bar 412 can be used as a point of contact between the waste receptacles 120 and a lid opening mechanism 416. The lid opening mechanism 416.

The lid opening mechanism 416 can be configured to mechanically open the lid when the waste receptacles 120 are moved or translated out of the cabinet. The lid opening mechanism 416 is configured to close the lid 124 onto the top of the waste receptacles 120 when the waste receiving system 100 is closed. When the waste receiving system 100 is closed, waste receptacles 120 are pushed up against the push bar 412. With the waste receptacles 120 pushed up against the push bar 412, the one or more air springs 272 are held in a first position. In the first position, the air springs 272 are compressed and have stored potential energy. When the waste receptacles 120 are moved away from the push bar 412, the restraining force on the air springs is removed and the lid opening mechanism 416 can open the lid 124. The air springs 272 can be advantageously positioned, sized and calibrated to open the lid 124 with the potential energy stored in the air springs 272. When the lid is closed again, the air springs 272 are pushed into their original position. Pushing the air springs 272 into their original positions can provide sufficient energy storage in the air springs 272 for the air spring 272 to lift the lid the next time the waste receptacles 120 are moved or translated out of the cabinet.

In some embodiments, the air springs 272, first hinges 292, main plate 304, second plate 320, second hinges 336, third plate 348, and third hinges 388 can be arranged as a mechanical system. In some embodiments, the mechanical system is a mechanical linkage. The number of links, vertices, and/or other components in the mechanical linkage can vary. The set of arrangements available to the linkage can vary based on the number and arrangement of the links, vertices and/or other components in the mechanical linkage. Varying the dimensions and the arrangement of the components in the mechanical linkage can alter the kinematics of the mechanical linkage. The kinematic properties of the opening of the waste receptacle lid 124 can be a function of the geometry and arrangement of the mechanical linkage. Various opening kinematic profiles are possible. The dynamic or kinetic properties of the mechanical linkage can be a function of the geometry, arrangement of the mechanical linkages, and the mechanical properties of the spring 272. In some embodiments, the waste receptacle lid 124 first moves laterally relative to the waste receptacles 120 when the waste-receiving system 100 opens, and then the waste receptacles lid 124 tilts upwards and away from the waste receptacles 120 as the waste-receiving system 100 continues to open. In some embodiments, the energy storage device 272 can be an air spring.

In some embodiments, as illustrated, the lid 124 can open automatically and without electrical assistance as the waste-receiving system 100 transitions from a closed or retracted position to an open or extended position, moving away from the opening(s) of the one or more trashcans to provide free and open access to a user for depositing trash in the one or more trashcans. The lid 124 can close automatically and without electrical assistance as the waste-receiving system

100 transitions from the open or extended position to the closed or retracted position, closing off the opening(s) of the one or more trashcans to generally contain or inhibit smells and vapors within the one or more trashcans from escaping into the surrounding environment.

As illustrated, the opening of the lid 124 can begin in an initial stage as the waste-receiving system 100 begins to move from a closed or retracted position to an open or extended position. In some embodiments, the lid 124 does not contact or drag along the top(s) of the one or more trashcans at all within the waste-receiving system 100 as the one or more trashcans move outwardly, or the lid 124 does not contact or drag along the top(s) of the one or more trashcans over a majority of the travel distance within the waste-receiving system 100 as the one or more trashcans move outwardly, which would otherwise create additional friction for the motor 164, or a user when manually pushing or pulling, making it more difficult to move. The opening of the lid 124 can be completed in a later stage that is sufficient to provide a user unimpeded or free access to the top opening(s) of the trashcan(s).

The following is claimed:

1. A waste-receiving system comprising:

at least one waste receptacle;

an electric drive system comprising a motor, the electric drive system configured to move the at least one waste receptacle from a retracted position within a cabinet to an extended position at least partially outside of the cabinet;

a sensor system configured to generate one or more electronic signals, the sensor system comprising a first sensor configured to detect a user;

a movement-monitoring system positioned on one or more lateral sides of the waste-receiving system and configured to move with the at least one waste receptacle as the at least one waste receptacle is moved from the retracted position to the extended position, the one or more lateral sides generally perpendicular or orthogonal to a region on which the first sensor of the sensor system is positioned, the movement-monitoring system configured to continuously or intermittently receive information related to a path of movement as the at least one waste receptacle is moved between the retracted position and the extended position; and a processor in electronic communication with the sensor system and the motor, the processor configured to actuate the motor based at least in part on the one or more electronic signals received from the sensor system.

2. The waste-receiving system of claim 1, further comprising the cabinet.

3. The waste-receiving system of claim 1, wherein the at least one waste receptacle is supported by a holder.

4. The waste-receiving system of claim 3, wherein the electric drive system is configured to move the at least one waste receptacle by moving the holder.

5. The waste-receiving system of claim 3, wherein the holder comprises a front bracket configured to receive a cabinet door, the front bracket being configured to move with the at least one waste receptacle.

6. The waste-receiving system of claim 1, wherein the sensor system comprises a light-based sensor.

7. The waste-receiving system of claim 6, wherein the light-based sensor is an infrared sensor.

8. The waste-receiving system of claim 1, wherein the sensor system comprises a microphone.

9. The waste-receiving system of claim 1, wherein the at least one waste receptacle comprises a plurality of waste receptacles.

10. The waste-receiving system of claim 1, further comprising a lid configured to cover the at least one waste receptacle.

11. The waste-receiving system of claim 10, wherein the lid is configured to open as the at least one waste receptacle moves from the retracted position to the extended position.

12. The waste-receiving system of claim 4, wherein the processor is configured to use the one or more electronic signals from the sensor system to control the electric drive system in order to avoid a collision with the holder as the electric drive system moves the at least one waste receptacle from the retracted position to the extended position.

13. The waste-receiving system of claim 1, further comprising a rail system.

14. The waste-receiving system of claim 13, wherein the rail system comprises a first rail and a second rail, the first rail comprising a plurality of wheels and tracks positioned on an interior surface of the first rail, and the second rail comprising a plurality of wheels and tracks positioned on an interior surface of the second rail.

15. The waste-receiving system of claim 14, wherein the plurality of wheels and tracks are not visible by a user in normal use.

16. The waste-receiving system of claim 15, wherein an exterior surface of the first rail is generally smooth and an exterior surface of the second rail is generally smooth.

17. The waste-receiving system of claim 3, wherein the holder comprises an upper surface on which a lower region of the at least one waste receptacle is supported.

18. The waste-receiving system of claim 17, wherein the holder comprises one or more recesses configured to closely or tightly receive the at least one waste receptacle, the one or more recesses configured to resist moving or tipping of the at least one waste receptacle as the electric drive system moves the at least one waste receptacle from the retracted position to the extended position.

19. The waste-receiving system of claim 1, wherein the electric drive system comprises an electric motor.

20. The waste-receiving system of claim 1, wherein the electric drive system comprises a solenoid.

21. The waste-receiving system of claim 1, wherein the electric drive system comprises a drive chain or drive belt.

22. A waste-receiving system comprising:

at least one waste receptacle;

an electric drive system comprising a motor, the electric drive system configured to move the at least one waste receptacle from a retracted position within a cabinet to an extended position at least partially outside of the cabinet;

a first sensor;

a movement-monitoring system configured to move with the at least one waste receptacle as the at least one waste receptacle is moved from the retracted position to the extended position, the movement-monitoring system configured to obtain information from a lateral region of the waste-receiving system and the first sensor configured to obtain information from a front region of the waste-receiving system, the movement-monitoring system configured to continuously or intermittently receive information related to a path of movement as the at least one waste receptacle is moved between the retracted position and the extended position; and a processor in electronic communication with the first sensor and the motor, the processor configured to actuate the motor based at least in part on one or more electronic signals received from the first sensor.

23. The waste-receiving system of claim 22, wherein the first sensor is configured to detect movement that occurs below the waste-receiving system.

24. The waste-receiving system of claim 1, wherein the first sensor is configured to detect movement that occurs below the waste-receiving system.

* * * * *